(12) United States Patent
Kennedy

(10) Patent No.: US 10,975,591 B2
(45) Date of Patent: Apr. 13, 2021

(54) CABLE RAILING SYSTEMS

(71) Applicant: Donald Erik Kennedy, Tiger, GA (US)

(72) Inventor: Donald Erik Kennedy, Tiger, GA (US)

( * ) Notice: Subject to any disclaimer, the term of this patent is extended or adjusted under 35 U.S.C. 154(b) by 543 days.

(21) Appl. No.: 15/983,699

(22) Filed: May 18, 2018

(65) Prior Publication Data

US 2019/0352926 A1 Nov. 21, 2019

(51) Int. Cl.
*E04H 17/12* (2006.01)
*E04H 17/04* (2006.01)
*E04H 17/26* (2006.01)
*B23B 51/04* (2006.01)
*B27G 15/00* (2006.01)

(52) U.S. Cl.
CPC ............ *E04H 17/12* (2013.01); *E04H 17/04* (2013.01); *E04H 17/266* (2013.01); *B23B 51/04* (2013.01); *B27G 15/00* (2013.01)

(58) Field of Classification Search
CPC ......... E04H 17/02; E04H 17/04; E04H 17/06; E04H 17/10; E04H 17/12; E04H 17/14; E04H 17/24; E04H 17/26; E04H 17/261; E04H 17/266; E04F 11/1859
See application file for complete search history.

(56) References Cited

U.S. PATENT DOCUMENTS

| | | | |
|---|---|---|---|
| 6,679,480 B1* | 1/2004 | Hara | E04H 17/10 |
| | | | 256/37 |
| 7,198,253 B2* | 4/2007 | Striebel | E04F 11/1834 |
| | | | 254/231 |
| 8,814,145 B2 | 8/2014 | Herman | |
| 9,126,289 B2 | 9/2015 | Herman | |
| 9,249,577 B2 | 2/2016 | Ross | |
| 9,689,410 B2* | 6/2017 | Ostervig | E04H 17/24 |
| 9,932,754 B2* | 4/2018 | Schlatter | E04H 17/06 |
| 10,221,522 B1* | 3/2019 | Henderson | F16B 9/054 |
| 10,655,358 B2* | 5/2020 | Sorkin | E04H 17/06 |
| 2013/0087753 A1* | 4/2013 | Landry | E04G 21/3219 |
| | | | 256/47 |
| 2018/0023316 A1* | 1/2018 | Leary | E04H 17/04 |
| | | | 256/47 |

OTHER PUBLICATIONS

"Cable Bullet Cable Rail System", https://www.cablebullet.com/, reviewed Jan. 7, 2019.

* cited by examiner

*Primary Examiner* — Jonathan P Masinick
(74) *Attorney, Agent, or Firm* — Thomas | Horstemeyer, LLP

(57) ABSTRACT

Various embodiments of cable railing systems are disclosed. Although not limited to these applications, the embodiments are particularly useful in connection with cable railing systems with solid wood support members or with solid concrete support members without weld plates. The embodiments include straight and corner cable termination assemblies that are designed to support a metal cable railing, particularly one that is heavy gauge.

32 Claims, 24 Drawing Sheets

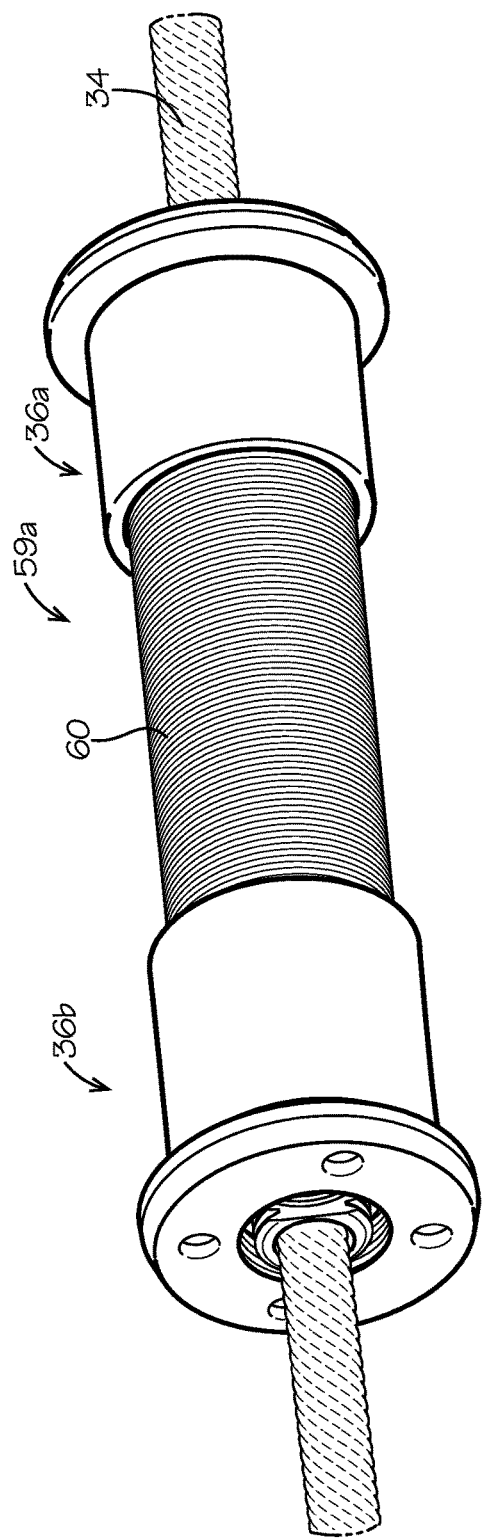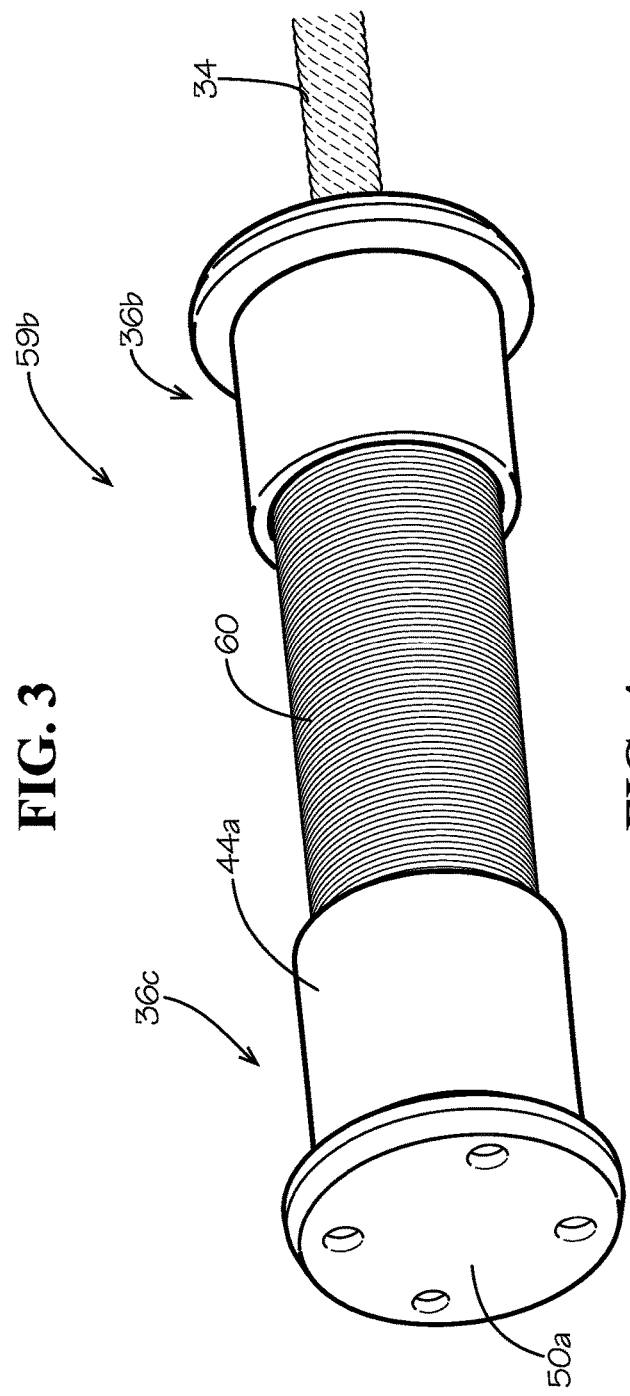
FIG. 3
FIG. 4

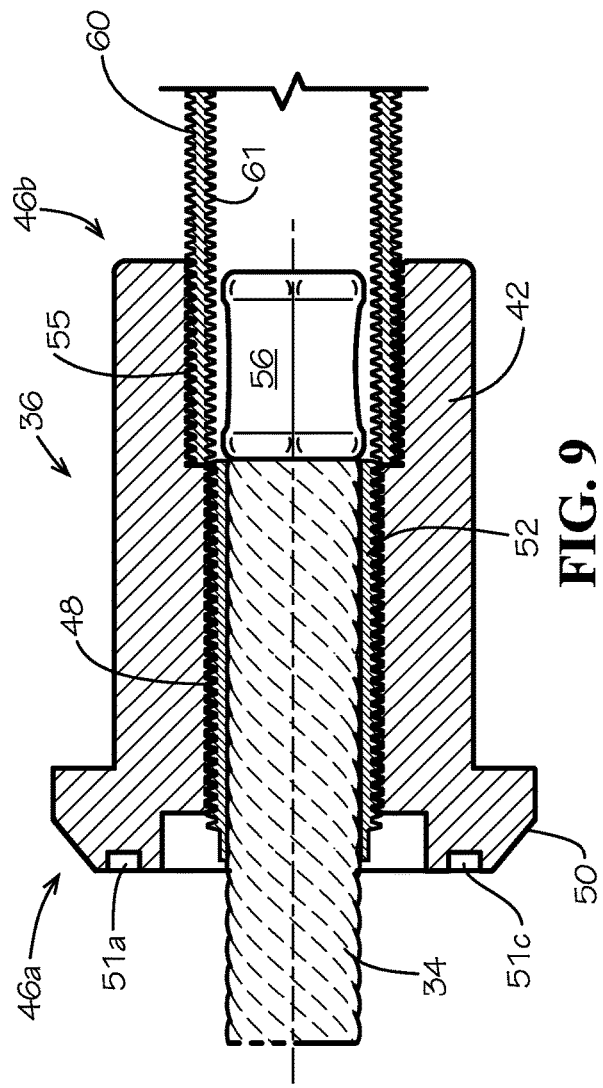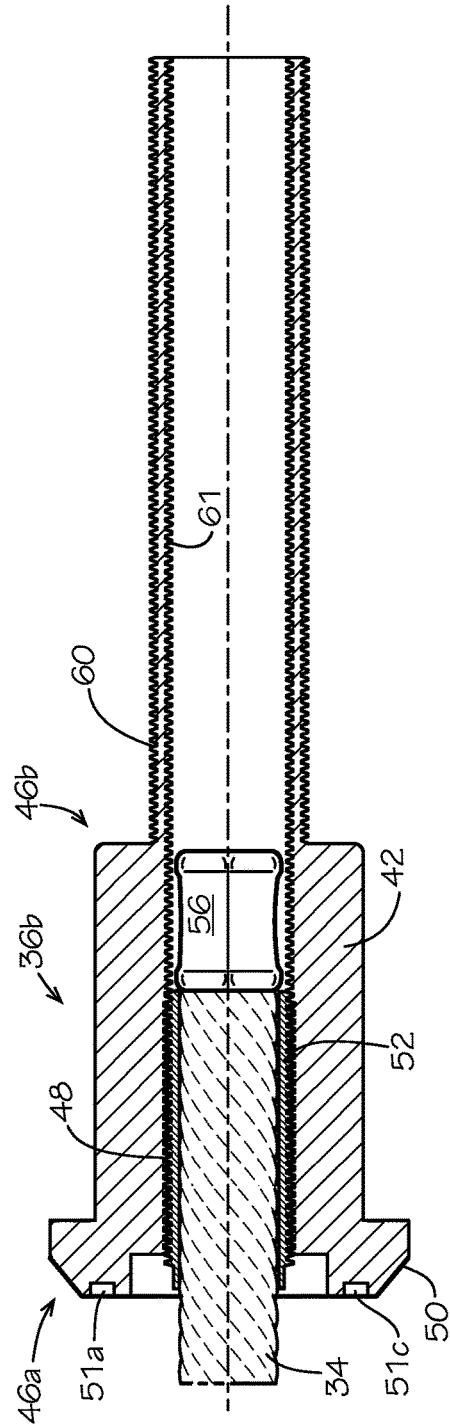

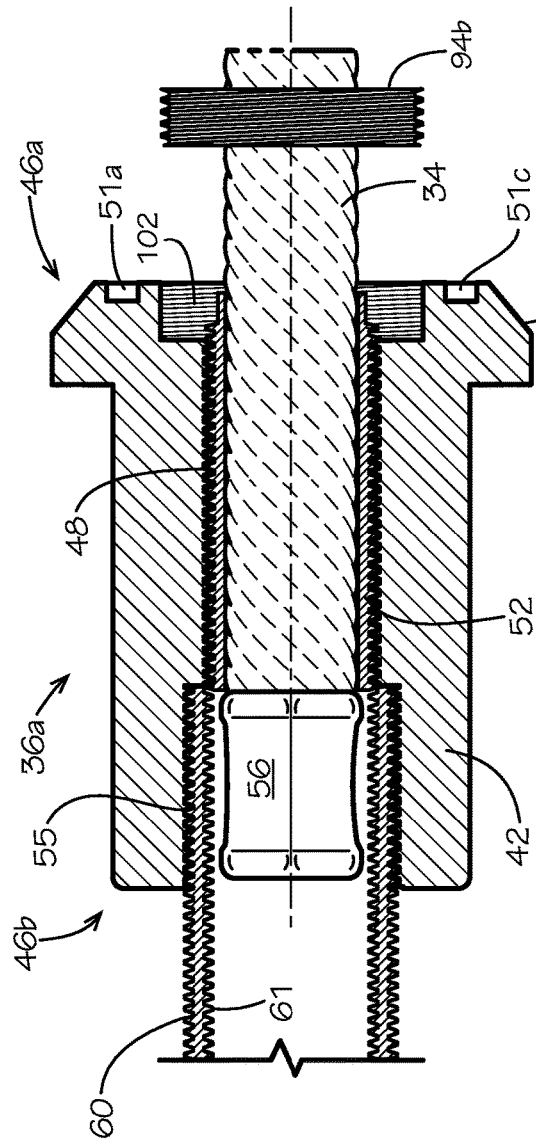
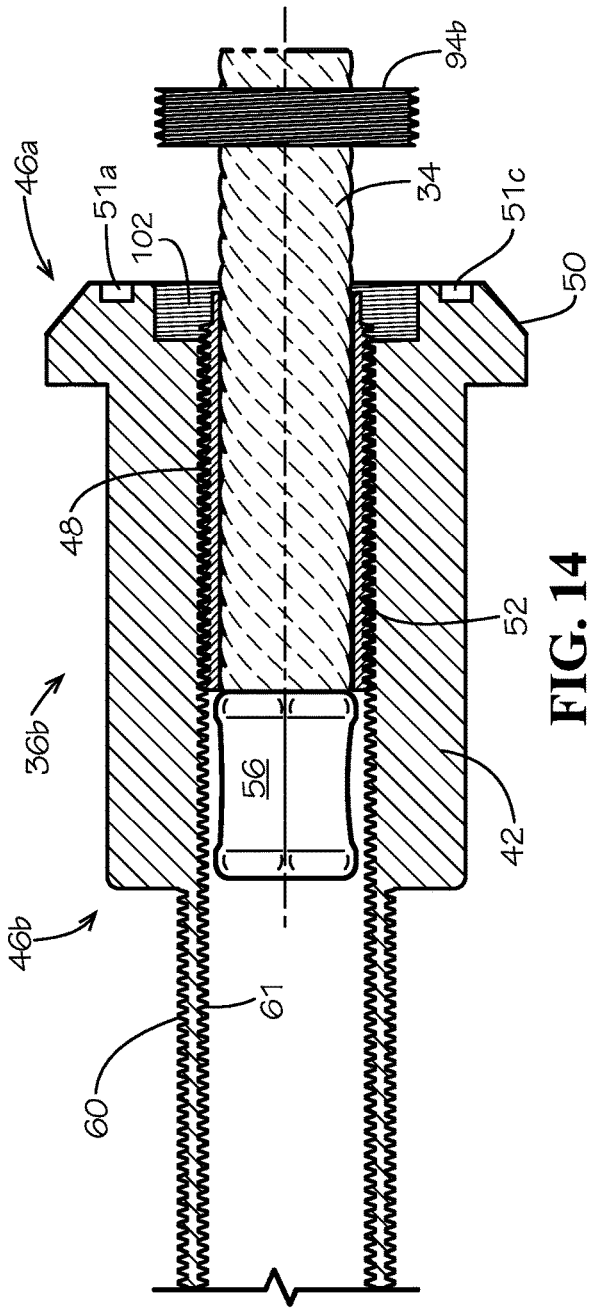

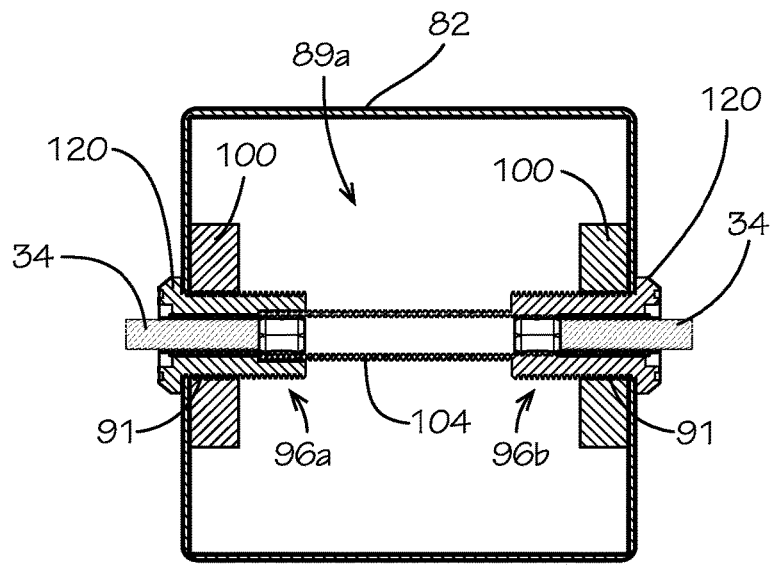
FIG. 19
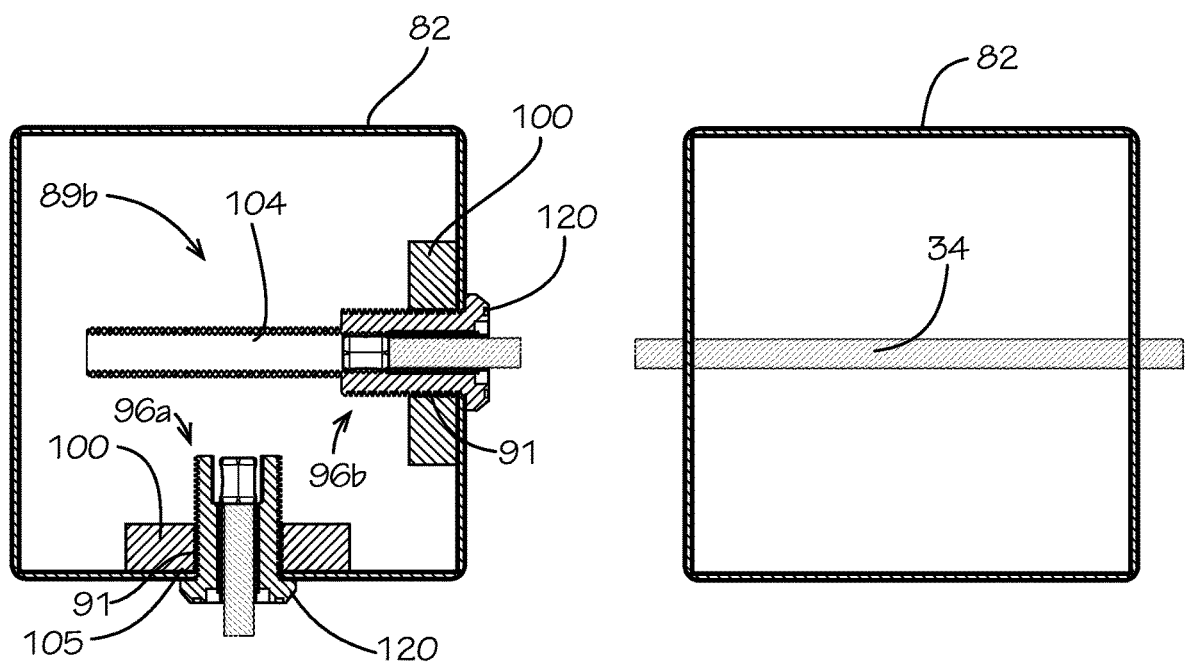
FIG. 20  FIG. 21

CABLE RAILING SYSTEMS

RELATED APPLICATION

This application is related to application Ser. No. 15/983,738, filed on even date herewith, titled "Cable Railing Systems," which is incorporated herein by reference in its entirety.

FIELD OF THE INVENTION

The present invention generally relates to railing systems and, more particularly, to metal cable railing systems for use in commercial and residential settings as well as interior and exterior settings, for example, to enclose decks, balconies, walkways, stairways, parking structures, etc.

BACKGROUND

A metal cable railing can be used in commercial and residential settings as well as interior and exterior settings, for example, to enclose decks, balconies, walkways, stairways, parking structures, etc. Cable railing generally has less material to obstruct a view as compared to other forms of railing, while providing a sufficiently strong and safe barrier for most applications. A drawback, however, is that the fasteners, including for example, turnbuckles, that are required to tighten the cable rails are exposed. These fasteners are unsightly and can be tampered with by individuals.

U.S. Pat. No. 9,249,577 describes a cable railing system that eliminates the need for turnbuckles or protruded fasteners; however, the fastening system used in U.S. Pat. No. 9,249,577 is still exposed and visible. This system is also undesirably complicated, requiring fasteners with many parts, including wedge locks, etc. The system can only be used with a cable railing system having hollow metal vertical stanchions, or support members. It cannot be used with a rail system having solid wood or concrete vertical support members. Furthermore, it appears to require a cable termination at each vertical support member of the cable railing system, particularly, at each corner. Finally, it is believed that this railing system has significant limitations in connection with supporting heavy gauge cables.

Better designs for cable railing systems are needed, particularly, those that can be more easily installed, that can use solid wood or concrete support members, and that can handle heavy gauge cables.

Furthermore, there is a need for cable railing systems where the cables run vertically. A significant advantage of a vertical configuration, among others, is that it eliminates the ladder effect, thus making it more difficult for a person to climb up and over the cable railing system. However, tensioning the cables, particularly heavy gauge cables, in a vertical configuration is problematic.

SUMMARY OF THE INVENTION

Various embodiments of cable railing systems and parts thereof are disclosed, a few of which are briefly discussed below. Although not limited to these applications, the various embodiments are particularly useful in connection with cable railing systems with solid wood support members or with concrete support members without weld plates.

One embodiment, among others, is a straight cable termination assembly for a railing system having a support member with a solid body (e.g., wood, concrete, etc.) that supports a metal cable railing. The straight cable termination assembly has a straight tensioning tube having an elongated cylindrical body extending from a first end to a second end. The tensioning tube is situated within a hole through the solid support member. First and second receptacle assemblies are mounted respectively at first and second ends of the tube. The first receptacle assembly is situated at a first side of the support member, and the second receptacle assembly is situated at a second side of the support member. The second side opposes the first side. In some embodiments, the tensioning tube is an integral part of the either the first or the second receptacle assembly, as opposed to a separate part, and is referred to herein as an extended tensioning tube.

In this embodiment, each receptacle assembly has (a) a cable end associated with a cable; (b) a receptacle having an elongated cylindrical body with first and second ends, the body having an elongated threaded receptacle channel extending between the first and second ends, the receptacle having a flange at the first end that extends outwardly in a radial direction from the body; (c) an elongated cylindrical threaded tensioning insert extending in the threaded channel of the body of the receptacle, the threaded tensioning insert having an elongated tensioning insert channel of sufficient size and shape to enable passage of the cable through the channel and being able to rotate, or free spin, in either clockwise or counterclockwise direction against the cable terminating part to effectuate tensioning of the cable; and (d) a cable terminating part that is mounted to the cable in close proximity to the cable end, the cable terminating part of sufficient size and shape to prevent the cable end from passing through the receptacle channel at the second end of the receptacle body. Notably, the tensioning insert is capable of extending at least in part into the tensioning tube channel due to the axial alignment of the receptacle channel and the tensioning tube channel. In some embodiments, a cylindrical concealment cap can be situated contiguous with the first end of the receptacle. The concealment cap has a hole through which the cable passes, and the concealment cap has a flat exterior surface that is substantially level with a surrounding surface.

Another embodiment, among others, is a corner cable termination assembly for a railing system having a support member with a solid body (e.g., wood, concrete, etc.) at a corner of the railing system that supports a metal cable railing. The corner cable termination assembly has a tensioning tube having an elongated cylindrical body extending from a first end to a second end, extending the interior length of the post or support member, allowing for additional cable and increasing the room for margin of error. The tube is situated within a hole through the solid support member. A corner adaptor tube having an elongated cylindrical body extends from a first end to a second end. The first end has a cylindrical threaded recessed part. The corner adaptor tube has a cylindrical threaded aperture that receives the third straight tensioning tube therethrough so that the bodies of the tensioning tube and the corner adaptor tube are at substantially a right angle. A first receptacle assembly is mounted at the first end of the tube. A second receptacle assembly is mounted to the recessed part of the corner adaptor tube. The opposing support member has a shorter, recessed cable termination assembly with a cylindrical body extending from a first end to a point in the interior of the support member. The tube is situated within a hole through the solid support member.

In this embodiment, each of the first and second receptacle assemblies has (a) a cable end associated with a cable; (b) a receptacle having an elongated cylindrical body with first and second ends, the body having an elongated threaded receptacle channel extending between the first and second ends, the receptacle having a flange at the first end that extends outwardly in a radial direction from the body; (c) an elongated cylindrical threaded tensioning insert extending in the threaded channel of the body of the receptacle, the threaded tensioning insert having an elongated tensioning insert channel of sufficient size and shape to enable passage of the cable through the channel and being able to free spin in either clockwise or counterclockwise direction against the cable terminating part to effectuate tensioning of the cable; and (d) a cable terminating part that is mounted to the cable in close proximity to the cable end, the cable terminating part of sufficient size and shape to prevent the cable end from passing through the receptacle channel at the second end of the receptacle body. Notably, in connection with the first receptacle assembly, the receptacle channel is in axial alignment with the tensioning tube channel so that the tensioning insert is capable of extending at least in part into the tensioning tube channel. In some embodiments, a cylindrical concealment cap can be situated contiguous with the first end of the receptacle. The concealment cap has a hole through which the cable passes, and the concealment cap has a flat exterior surface that is substantially level with a surrounding surface.

Other embodiments, systems, methods, apparatus, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. All the drawings are for illustration only.

Horizontal Cable Railing Systems with Wood Support Members

FIG. 3 is an assembled view of a straight cable termination assembly for two opposing cables situated within the middle support member of FIG. 1.

FIG. 4 is an assembled view of a straight cable termination assembly of a cable at one end and an end cap at an opposing end that can be situated in a wood support member.

FIG. 9 is side cross-sectional view of the receptacle assembly of FIGS. 3 and 5 through 8.

FIG. 10 is a side cross-sectional view of an extended receptacle assembly of FIGS. 3 through 7.

FIG. 13 is a cross-sectional view of another embodiment of a receptacle assembly where a concealment cap with threaded periphery is installed in a threaded recess within the receptacle assembly.

FIG. 14 is a cross-sectional view of another embodiment of an extended receptacle assembly where a concealment cap with threaded periphery is installed in a threaded recess within the extended receptacle assembly.

Horizontal Cable Railing Systems with Metal Support Members

Figure 17:
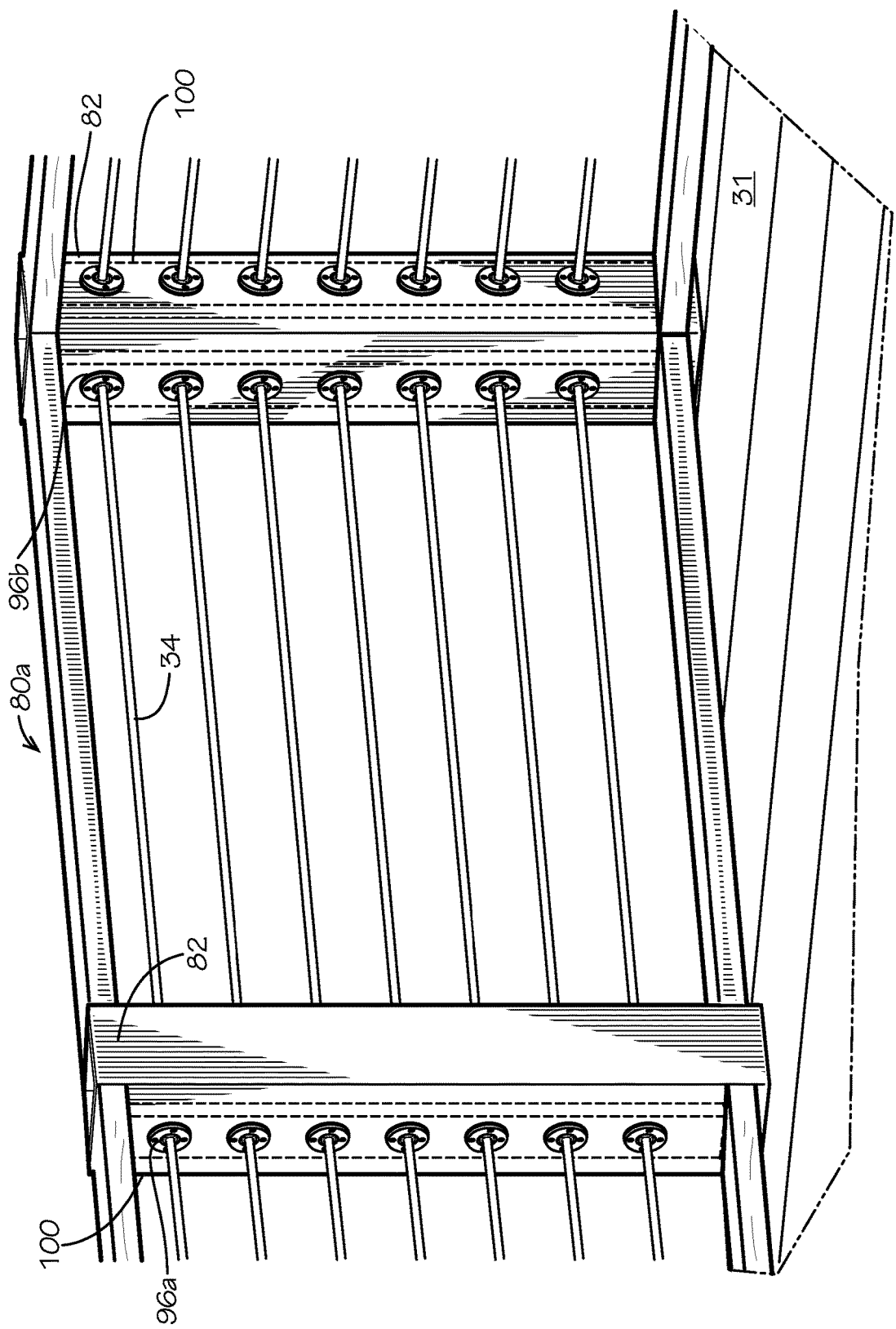

FIG. 17 is a perspective view of a cable railing system in accordance with an embodiment of the present invention that uses metal vertical support members where cables are terminated at each vertical support member with assistance of receptacle assemblies and internal vertical support member bars.

Figure 18:
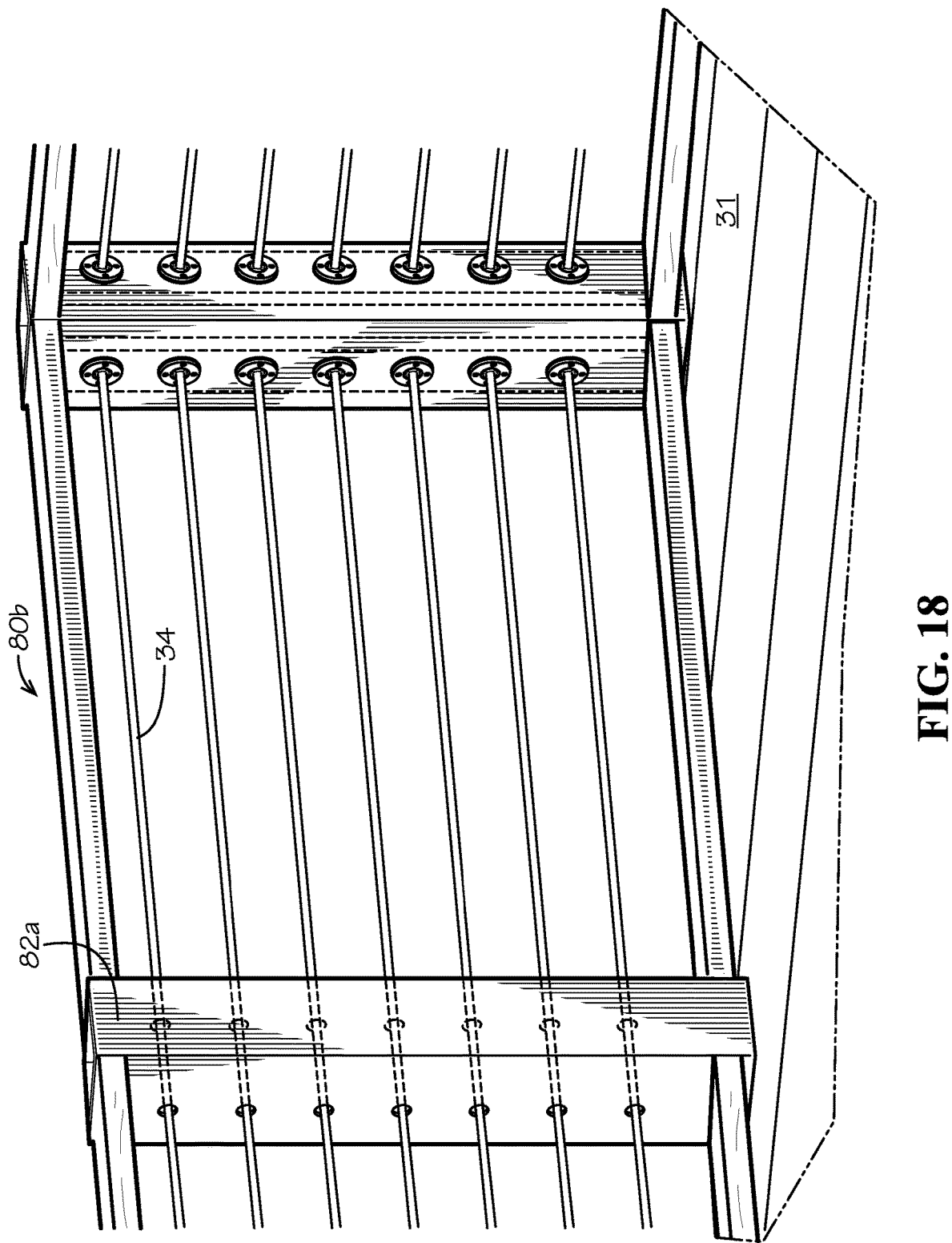

FIG. 18 is a perspective view of a cable railing system in accordance with another embodiment of the present invention that uses metal vertical support members where cables are terminated at some of the vertical support members while cables pass through other middle (non-corner) support members in an unterminated manner.

FIG. 19 is a top assembly view of a straight cable termination assembly for two opposing cables situated within the middle support member of FIG. 17.

FIG. 20 is a top assembly view of a corner cable termination assembly for two cables at a right angle situated within the corner support member of FIGS. 17 and 18.

FIG. 21 is a top view of an alternative pass through embodiment showing unterminated passage of a cable through the middle support member of FIG. 18.

Figure 22:
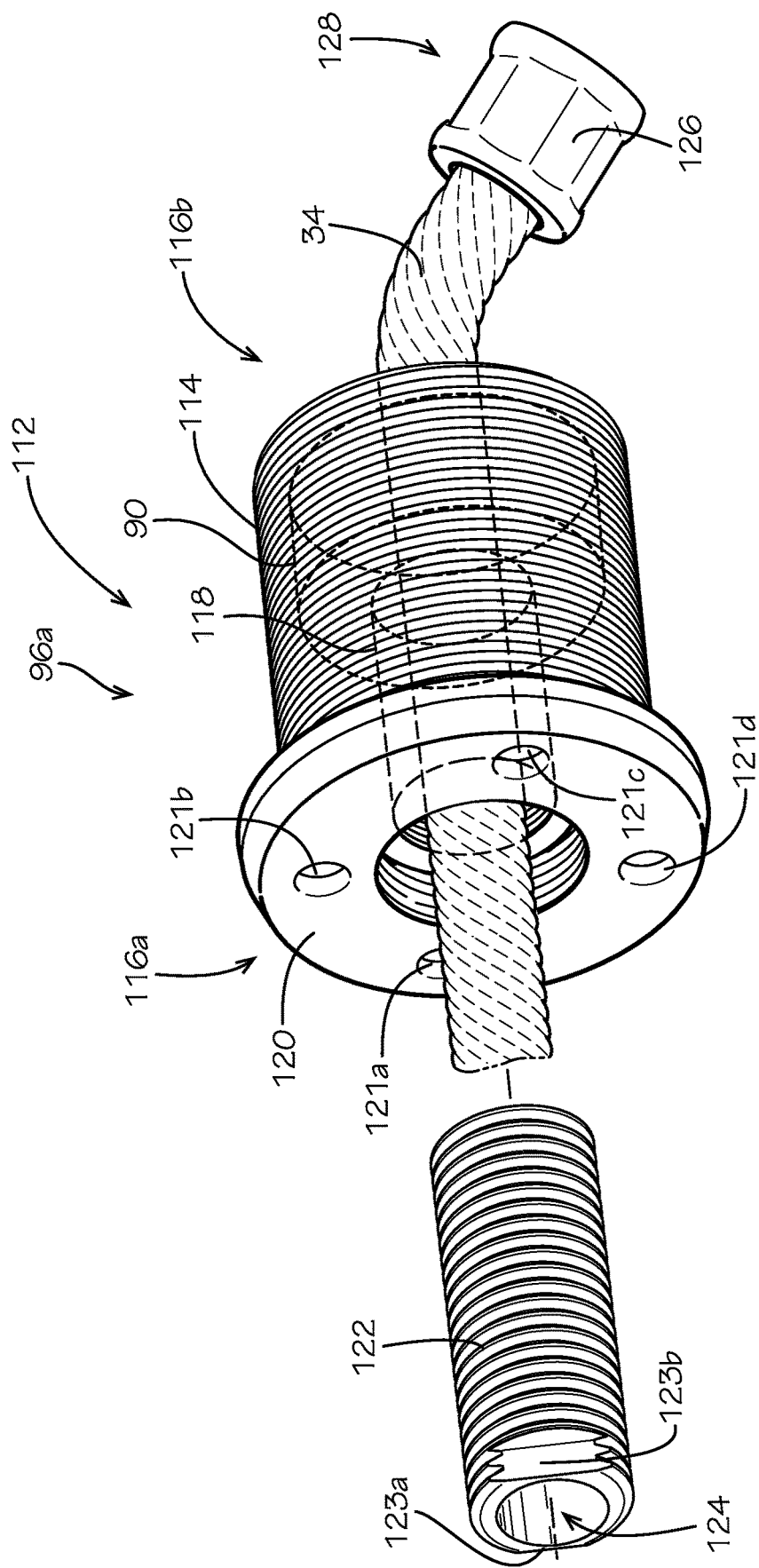

FIG. 22 is an exploded view of a receptacle assembly associated with the cable associated with the cable termination assemblies of FIGS. 19 and 20.

Figure 23:
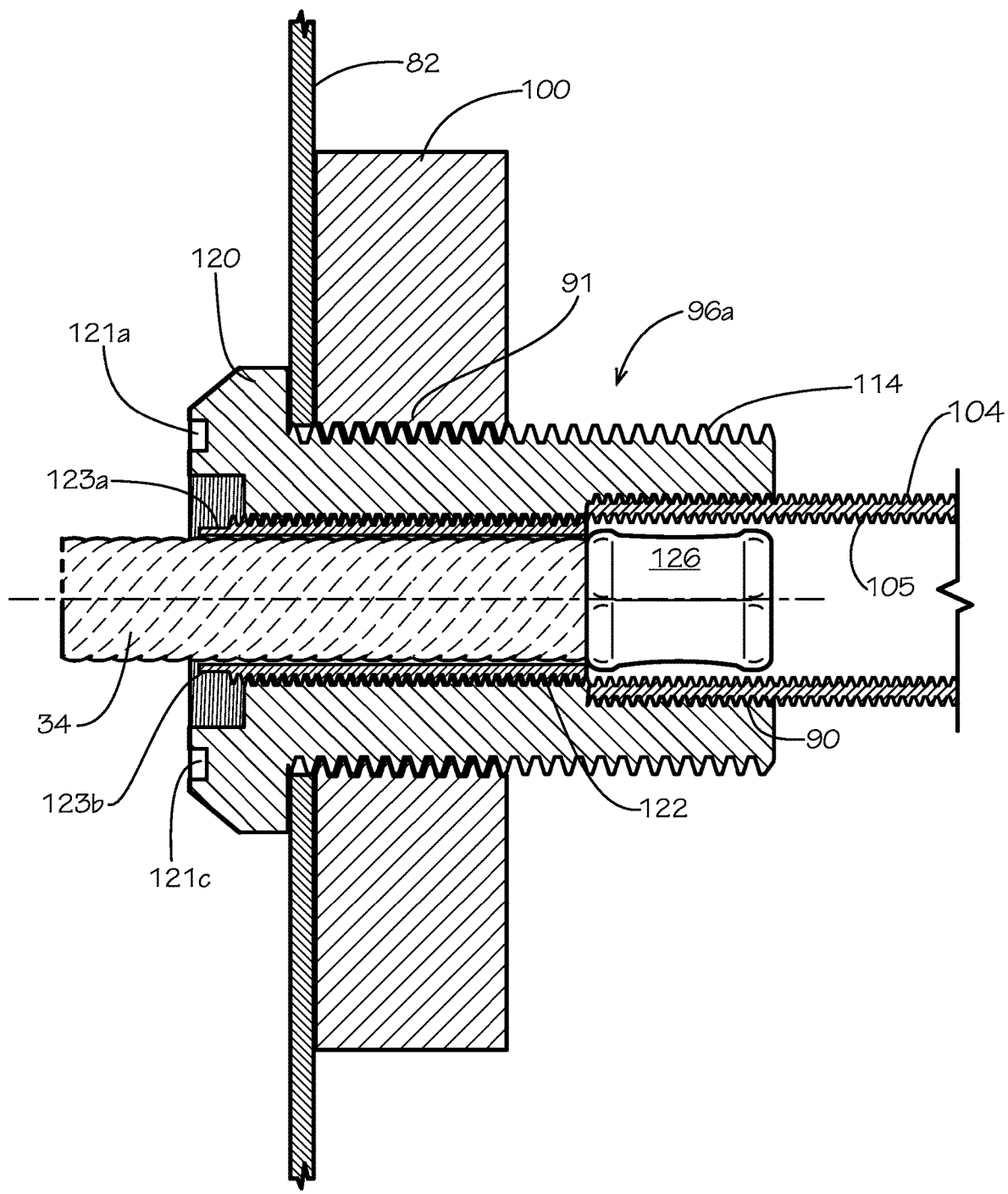

FIG. 23 is a cross-sectional view of the receptacle assembly of FIGS. 19, 20, and 22.

Figure 24:
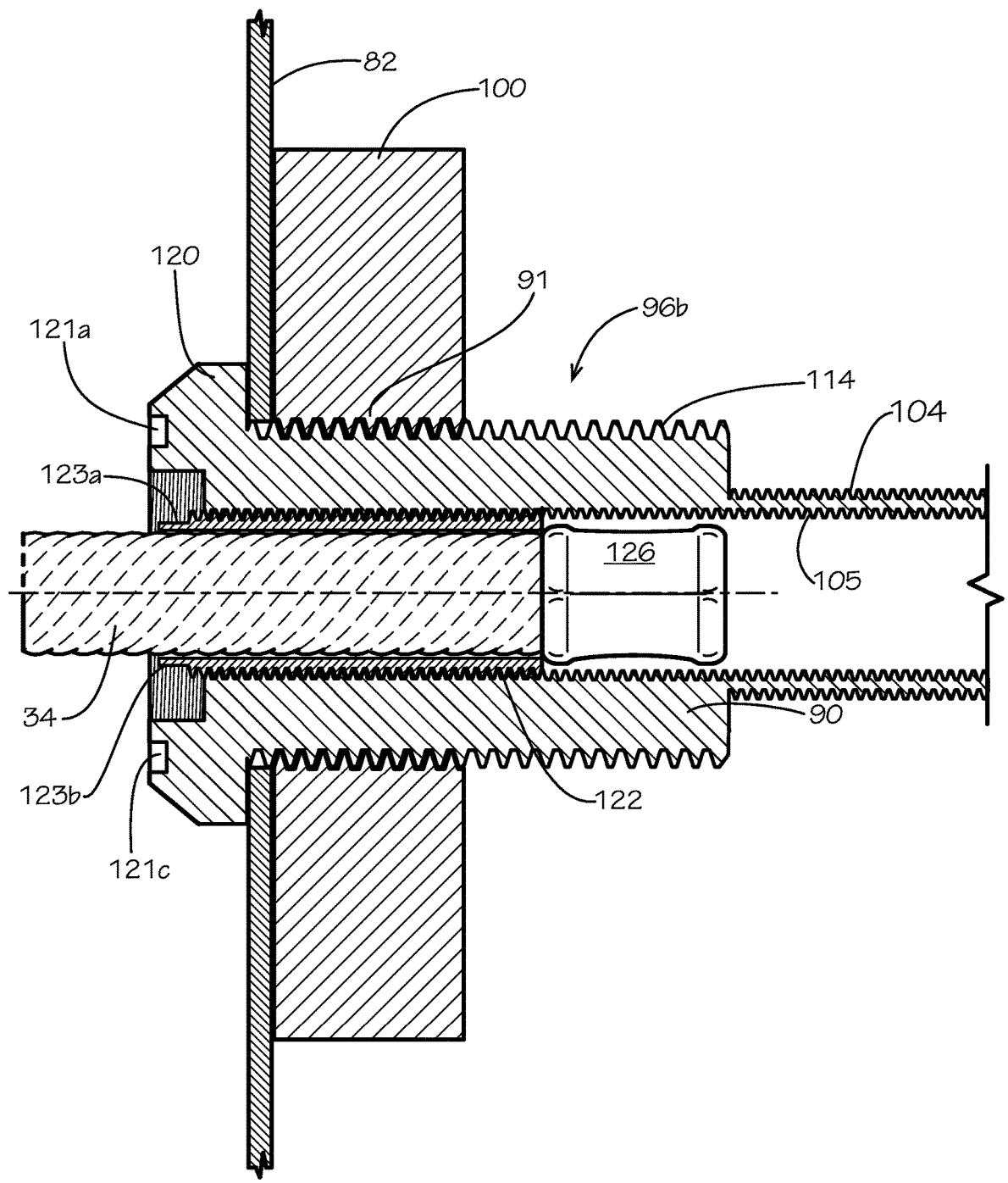

FIG. 24 is a cross-sectional view of an extended receptacle assembly of FIGS. 19 and 20.

Figure 25:
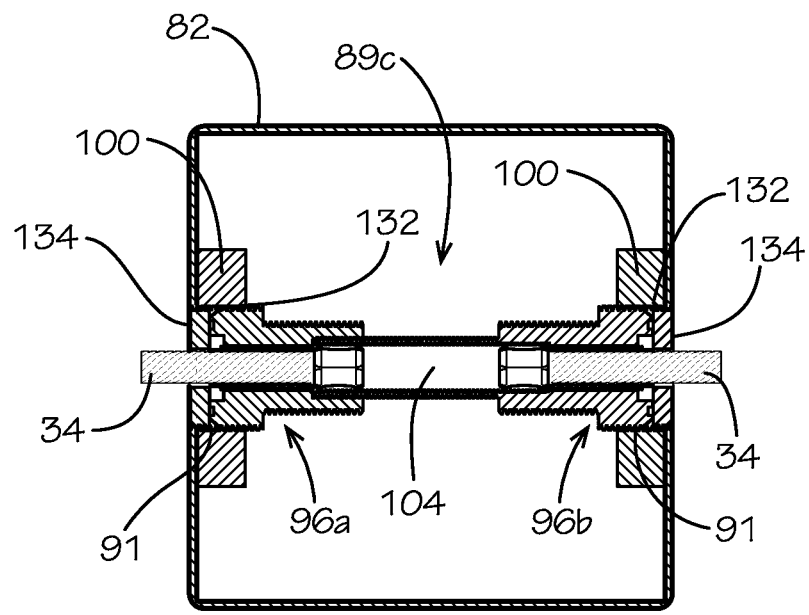

FIG. 25 is a top assembly view of another embodiment of a straight cable termination assembly for two opposing cables situated within the middle support member of FIG. 17.

Figure 26:
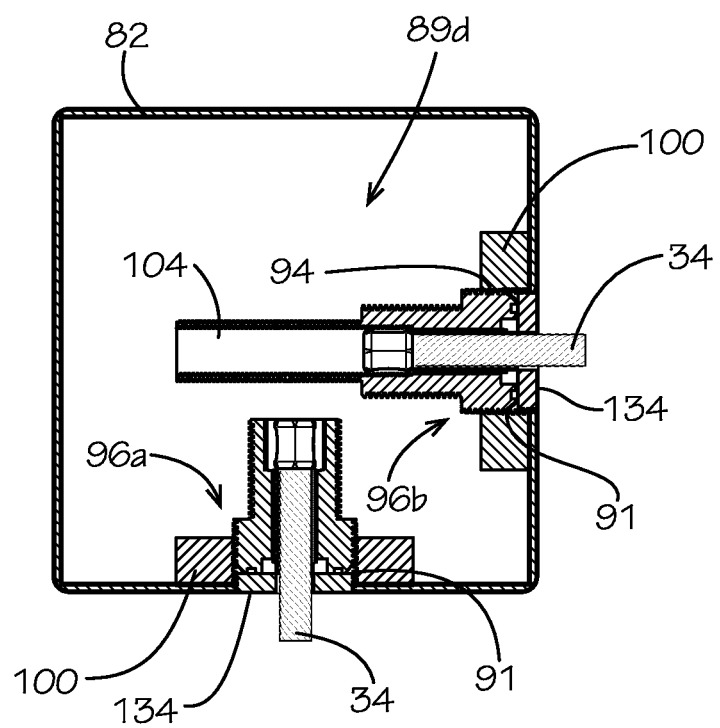

FIG. 26 is a top assembly view of another embodiment of a corner cable termination assembly for two cables at a right angle situated within the corner support member of FIGS. 17 and 18.

Figure 27:
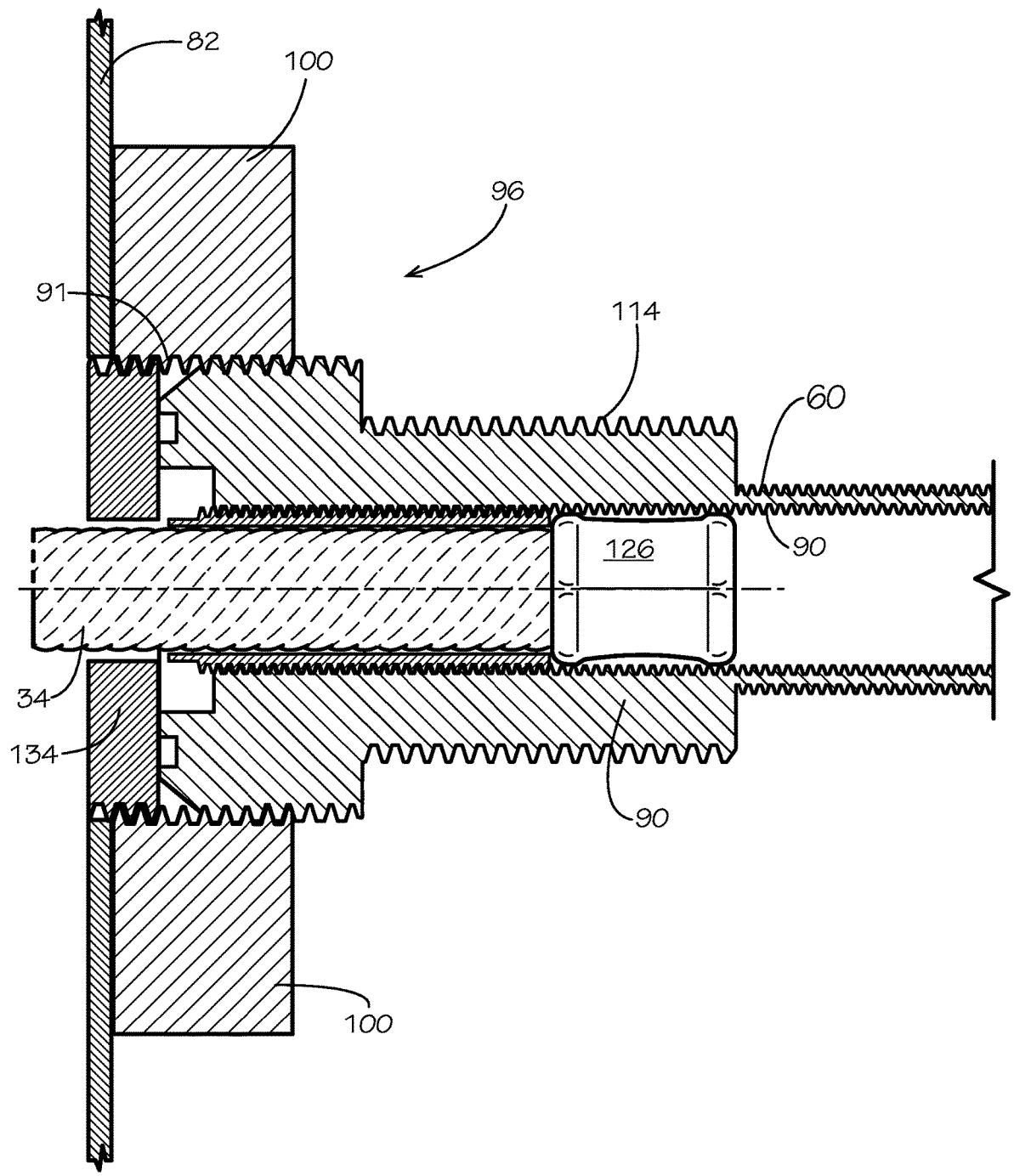

FIG. 27 is a cross-sectional view of the receptacle assembly used in the straight and corner termination assemblies of FIGS. 22 and 23.

Figure 28:
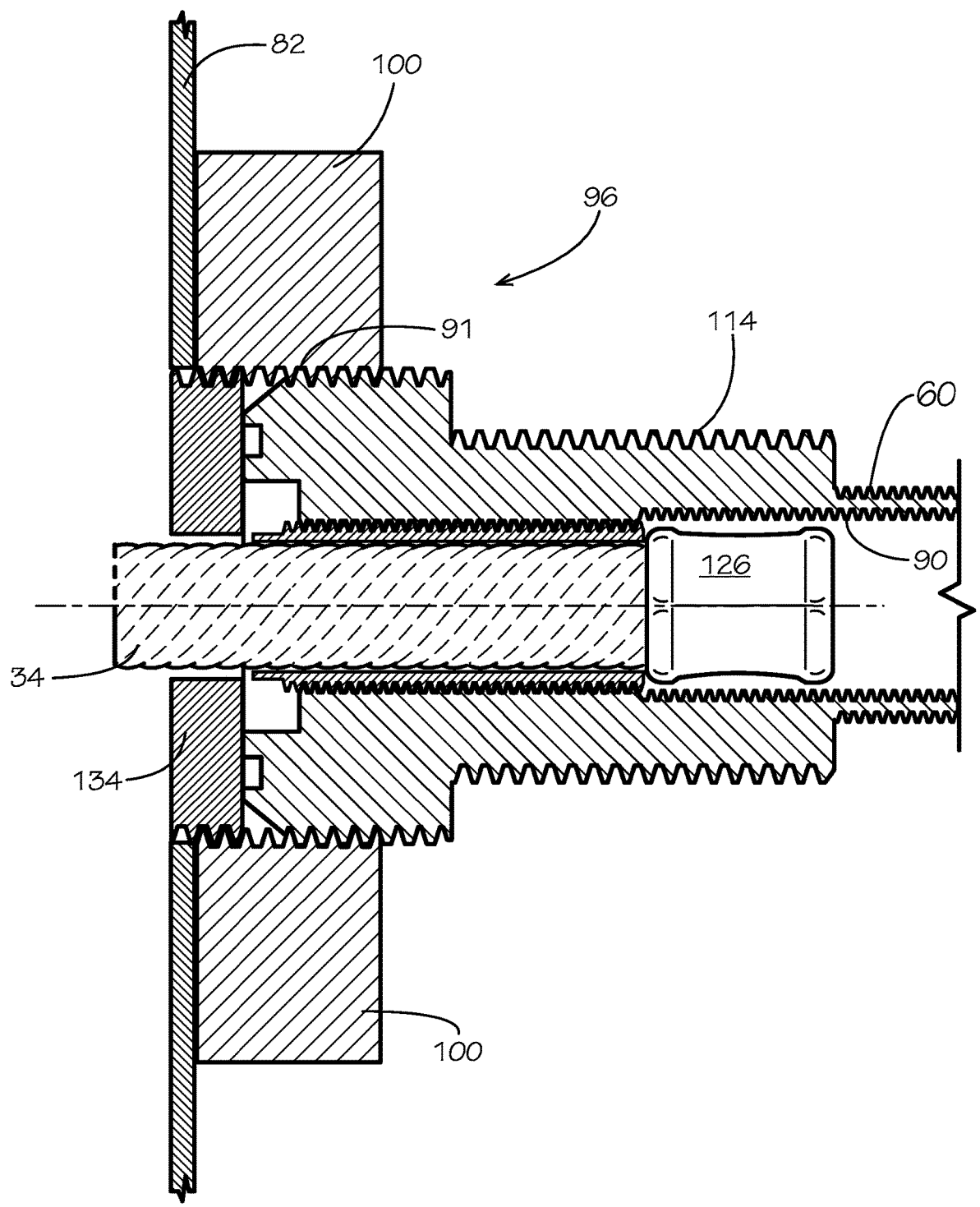

FIG. 28 is a cross-sectional view of an extended receptacle assembly used in the straight and corner termination assemblies of FIGS. 22 and 23.

Receptacle Installation Tool

Figure 29:
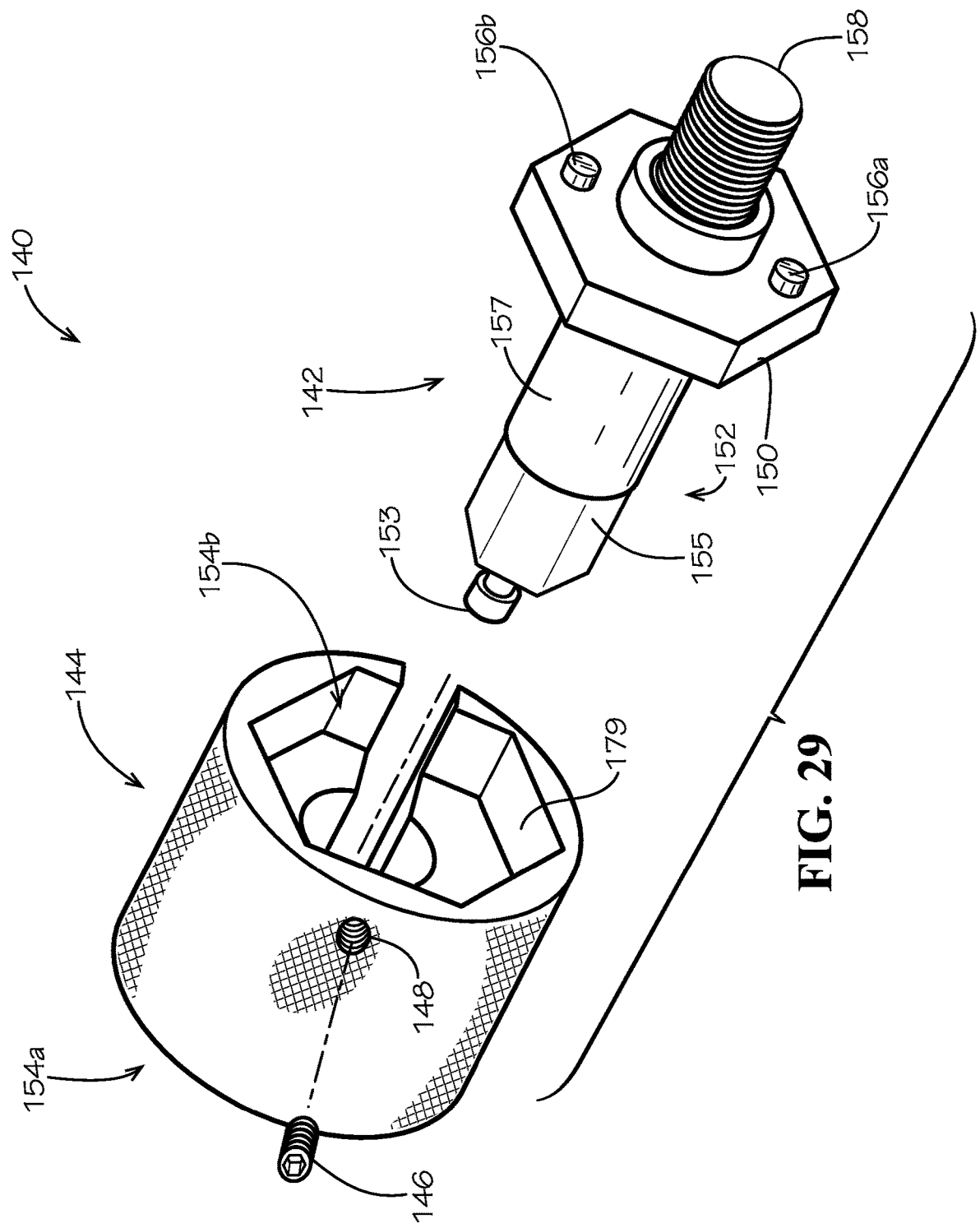

FIG. 29 is an exploded perspective view of a receptacle installation tool that can be used to install a receptacle associated with any of the receptacle termination assemblies.

Figure 30:
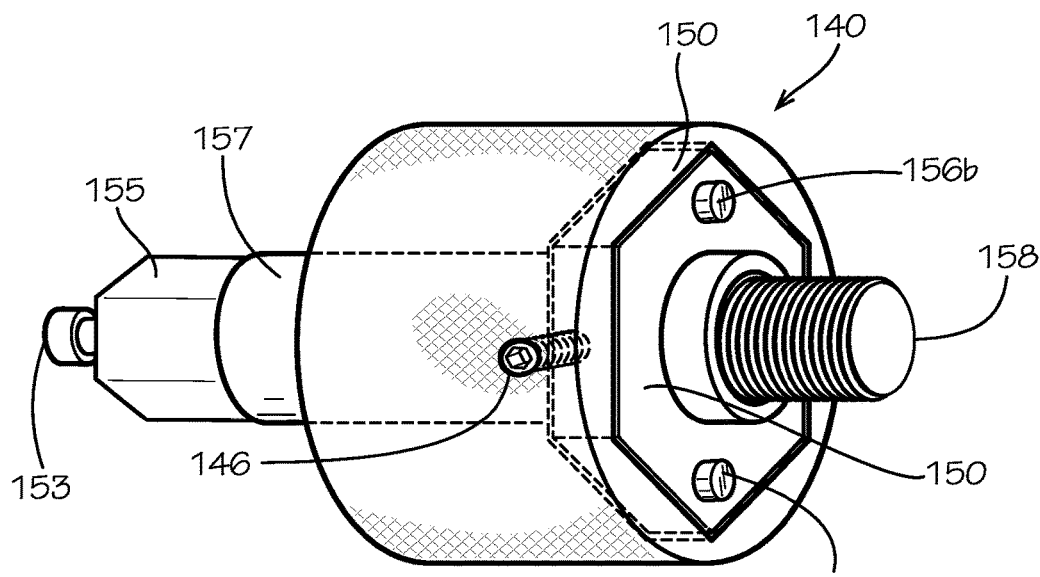

FIG. 30 is an assembled perspective view of the receptacle installation tool of FIG. 29.

Figure 31:
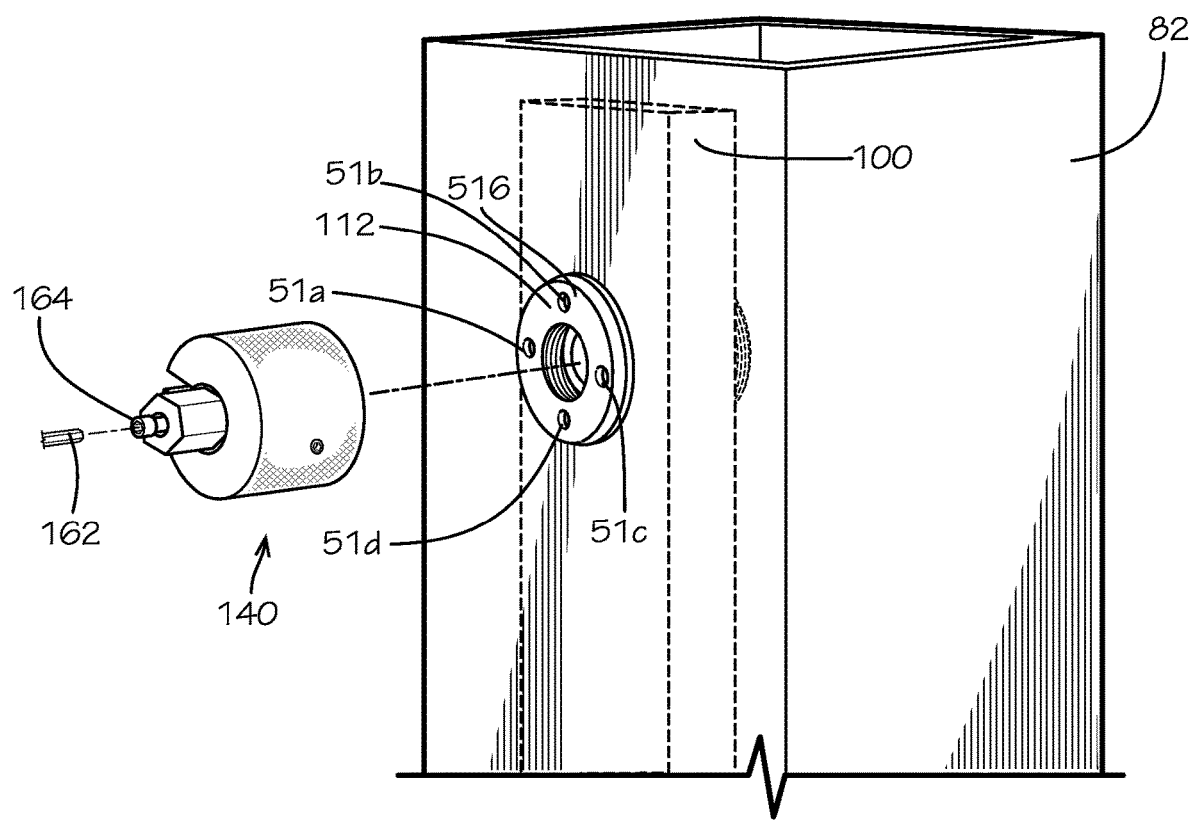

FIG. 31 is an exploded perspective view showing how the receptacle installation tool of FIG. 30 is positioned against a receptacle and attached to the receptacle with a wrench.

Figure 32:
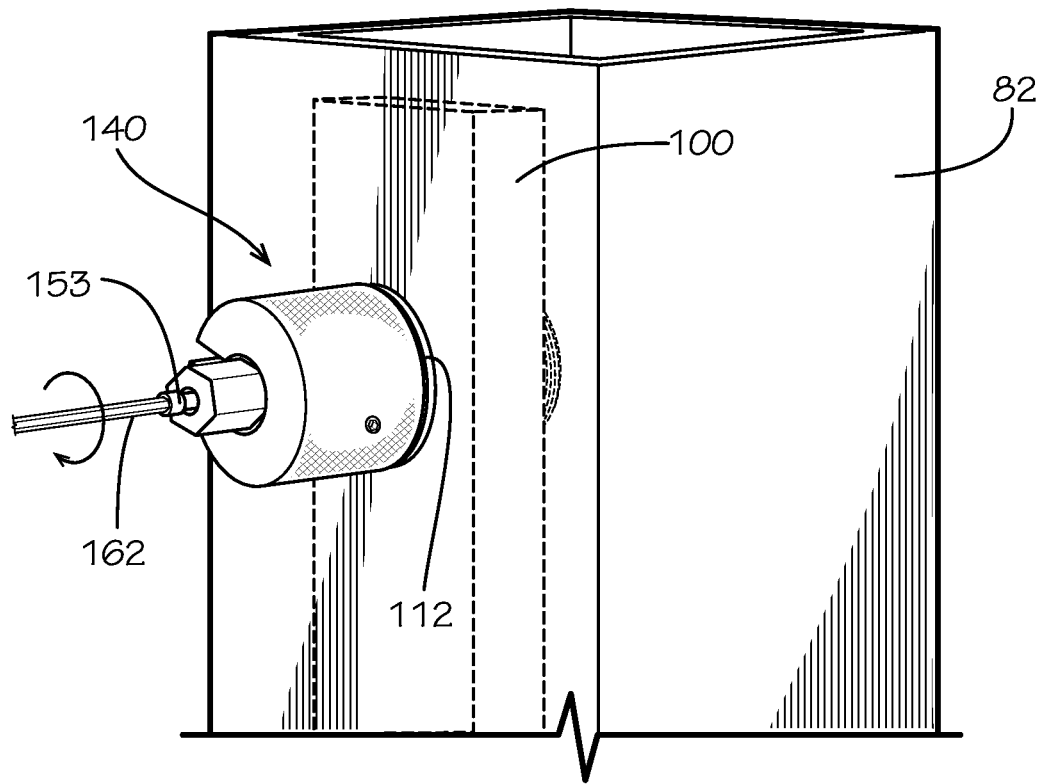

FIG. 32 is a perspective view showing how the receptacle installation tool of FIG. 30 is rotated with the wrench in order to attach the receptacle installation tool to the receptacle.

Figure 33:
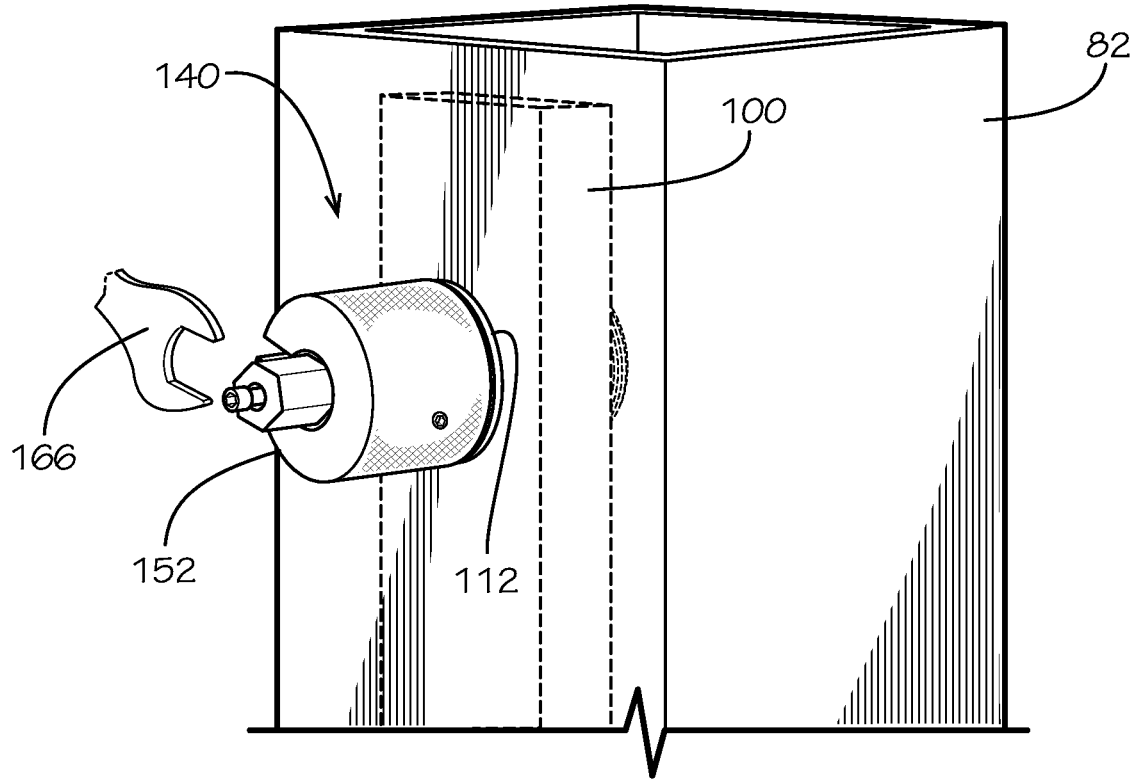

FIG. 33 is a perspective view showing how the receptacle installation tool of FIG. 30 is rotated with a wrench in order to rotationally drive the receptacle into the support member.

Cable Tensioning Tool

Figure 34:
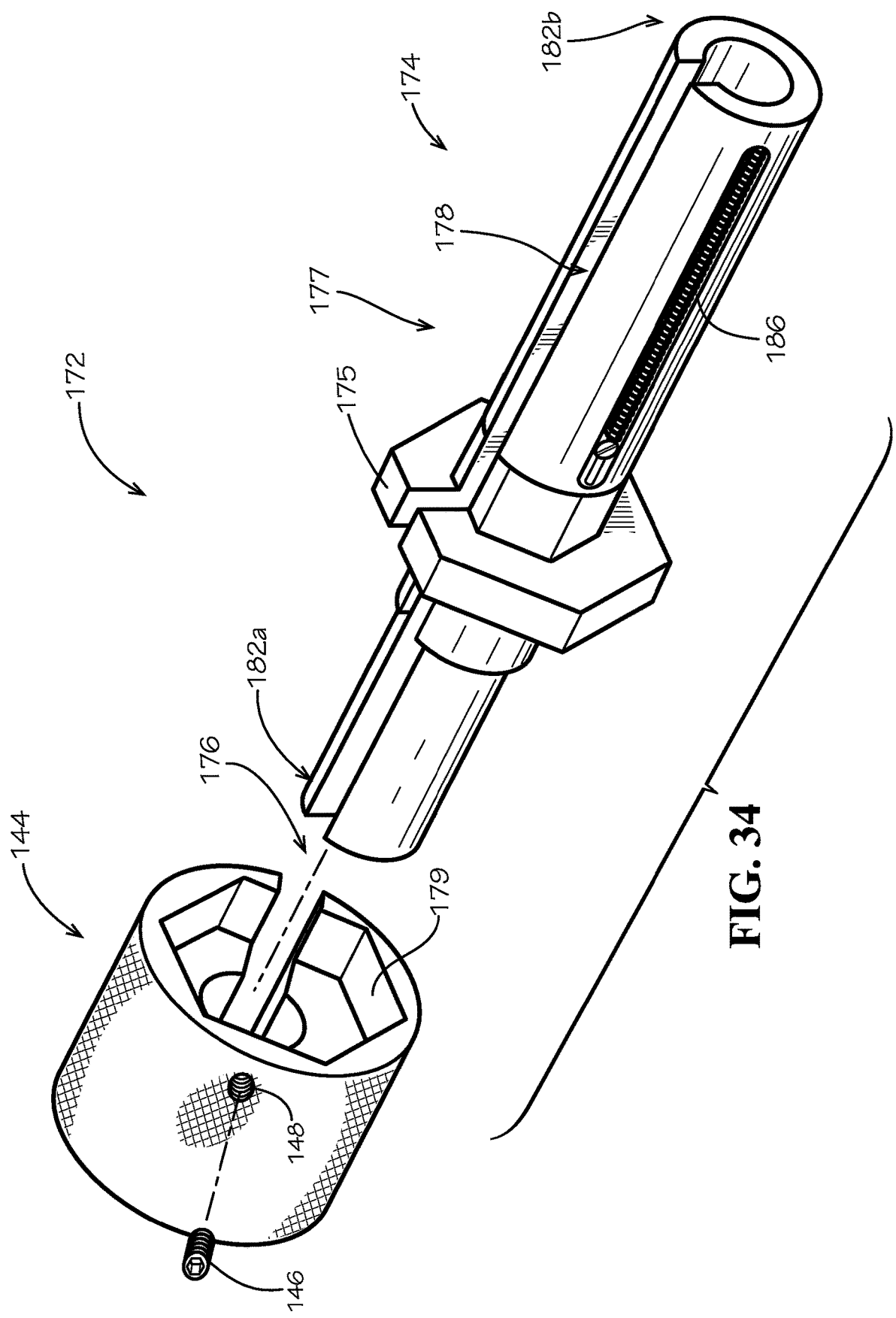

FIG. 34 is an exploded perspective view of a cable tensioning tool that can be used to provide tension to a cable after the receptacle assembly has been installed.

Figure 35:
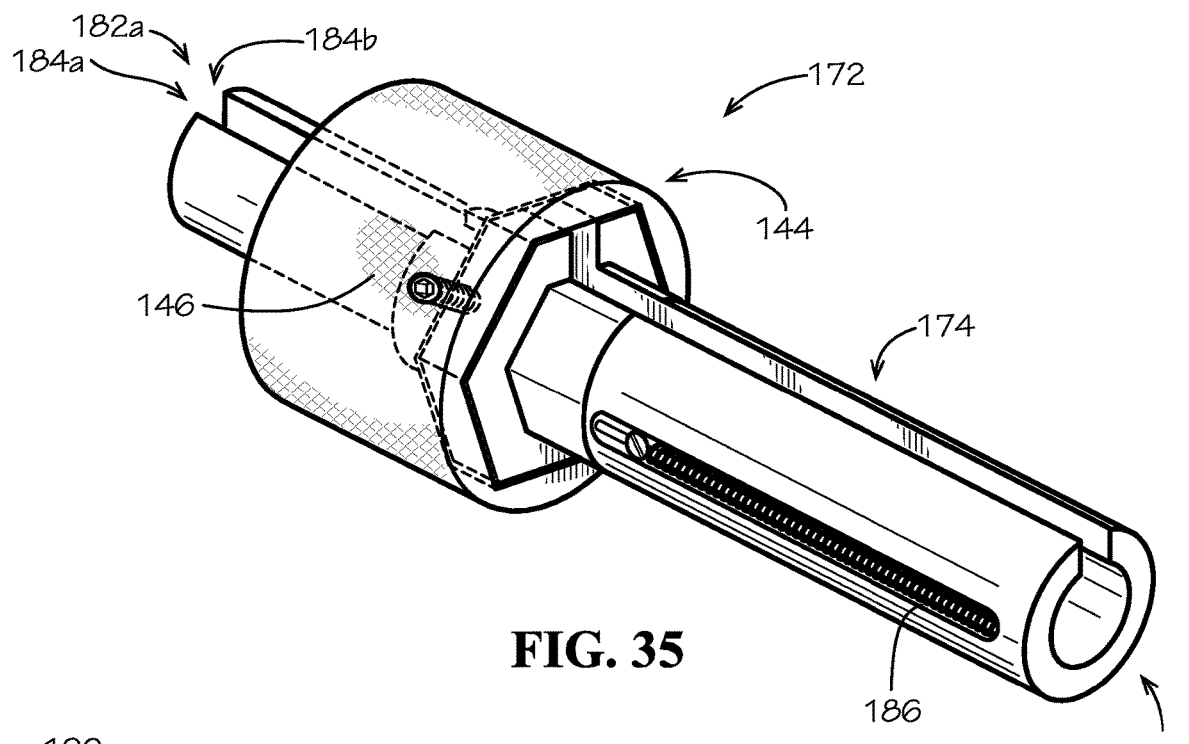

FIG. 35 is an assembled perspective view of the cable tensioning tool of FIG. 34.

Vertical Cable Railing Systems

Figure 36:
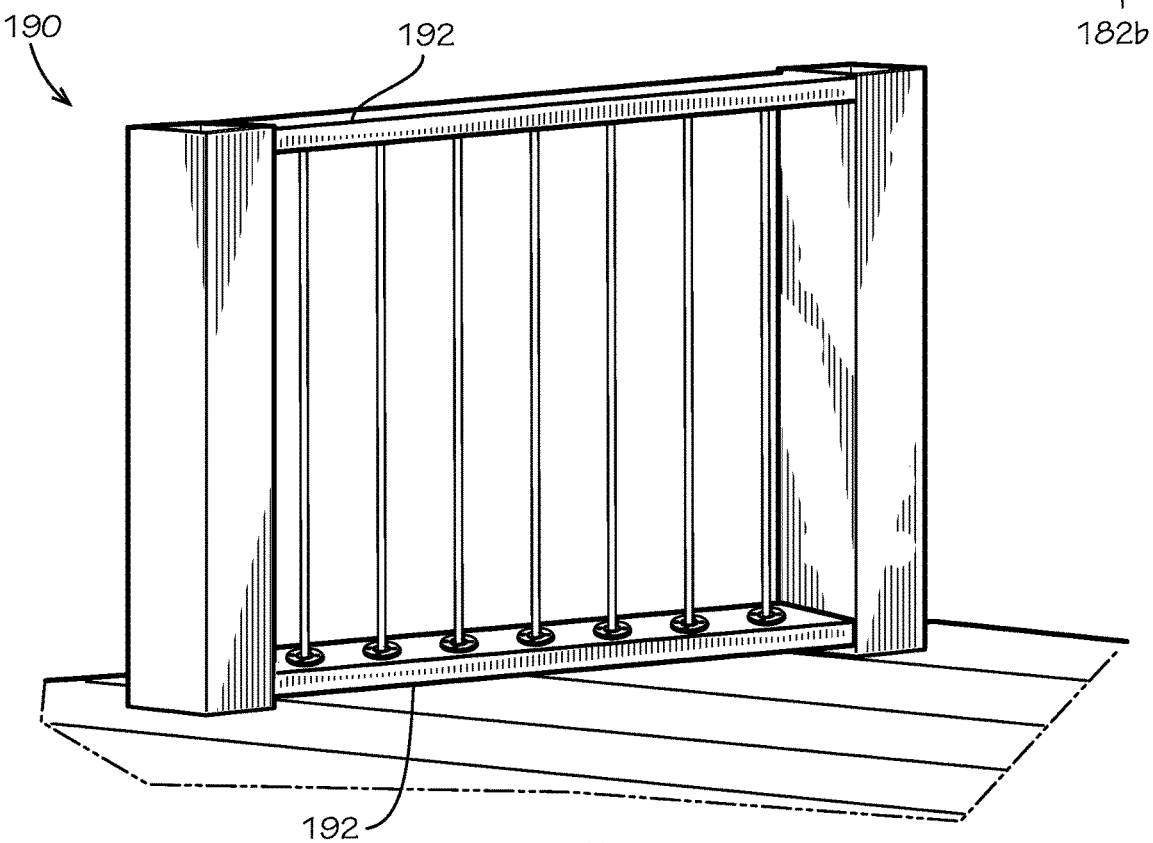

FIG. 36 is a perspective view of an embodiment of a railing system having vertical cables with wood, metal, and/or cement support members.

DETAILED DESCRIPTION OF THE INVENTION

Various embodiments of a cable railing system and parts thereof in accordance with the present invention will now be described in detail.

Horizontal Cable Railing Systems with Wood Support Members

Figure 1:
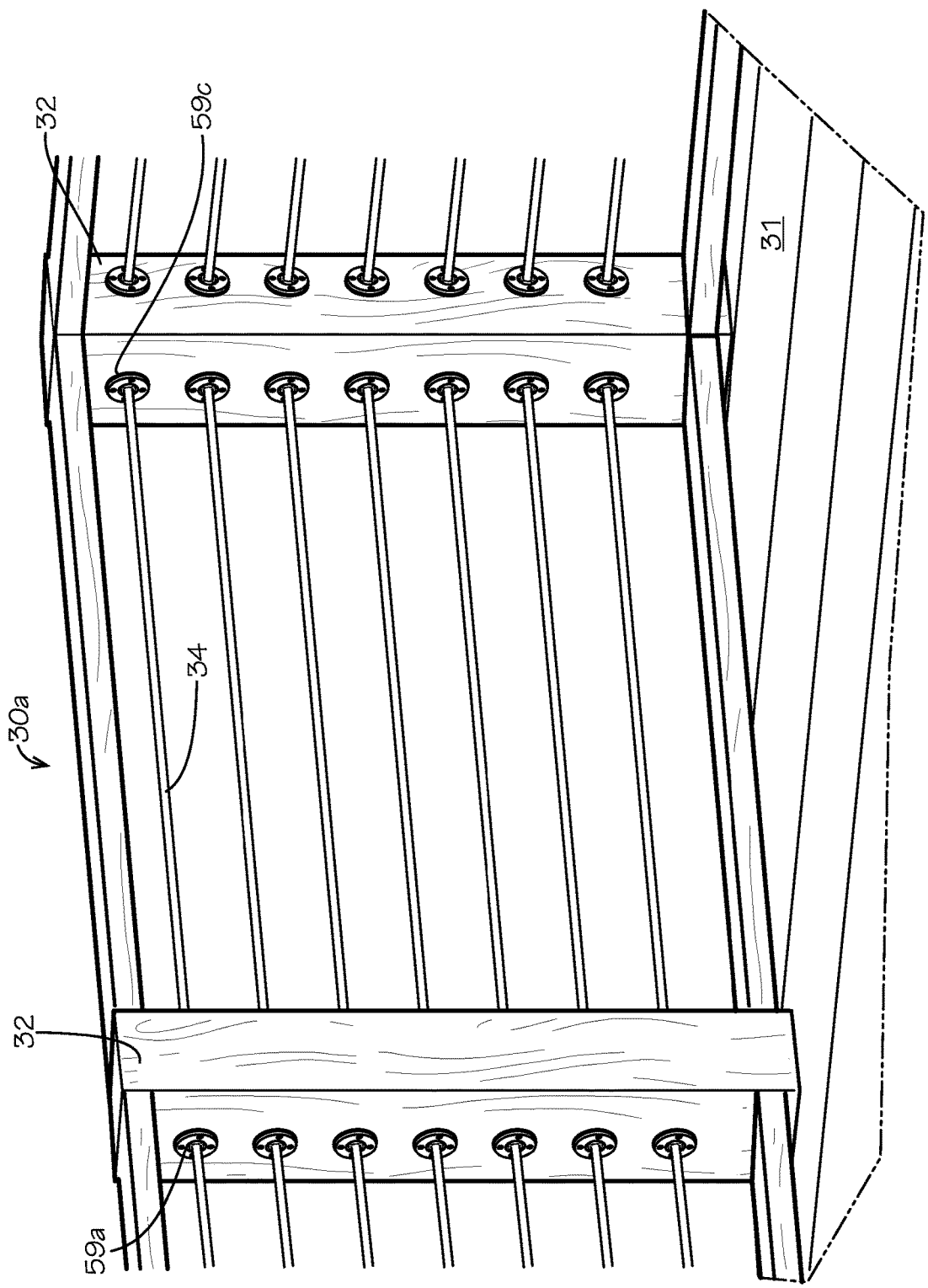
FIG. 1 is a perspective view of a cable railing system in accordance with an embodiment of the present invention that uses wood vertical support members where cables are terminated at each vertical support member with cable termination assemblies.

FIG. 1 is a perspective view of a cable railing system 30a in accordance with an embodiment of the present invention. The cable railing system 30a is shown installed on a deck 31. The cable railing system 30a uses wood vertical support members 32 where cables 34 are terminated at vertical support members 32 with cable termination assemblies (FIGS. 3 to 7) that are suited for wood support members 32.

Figure 2:
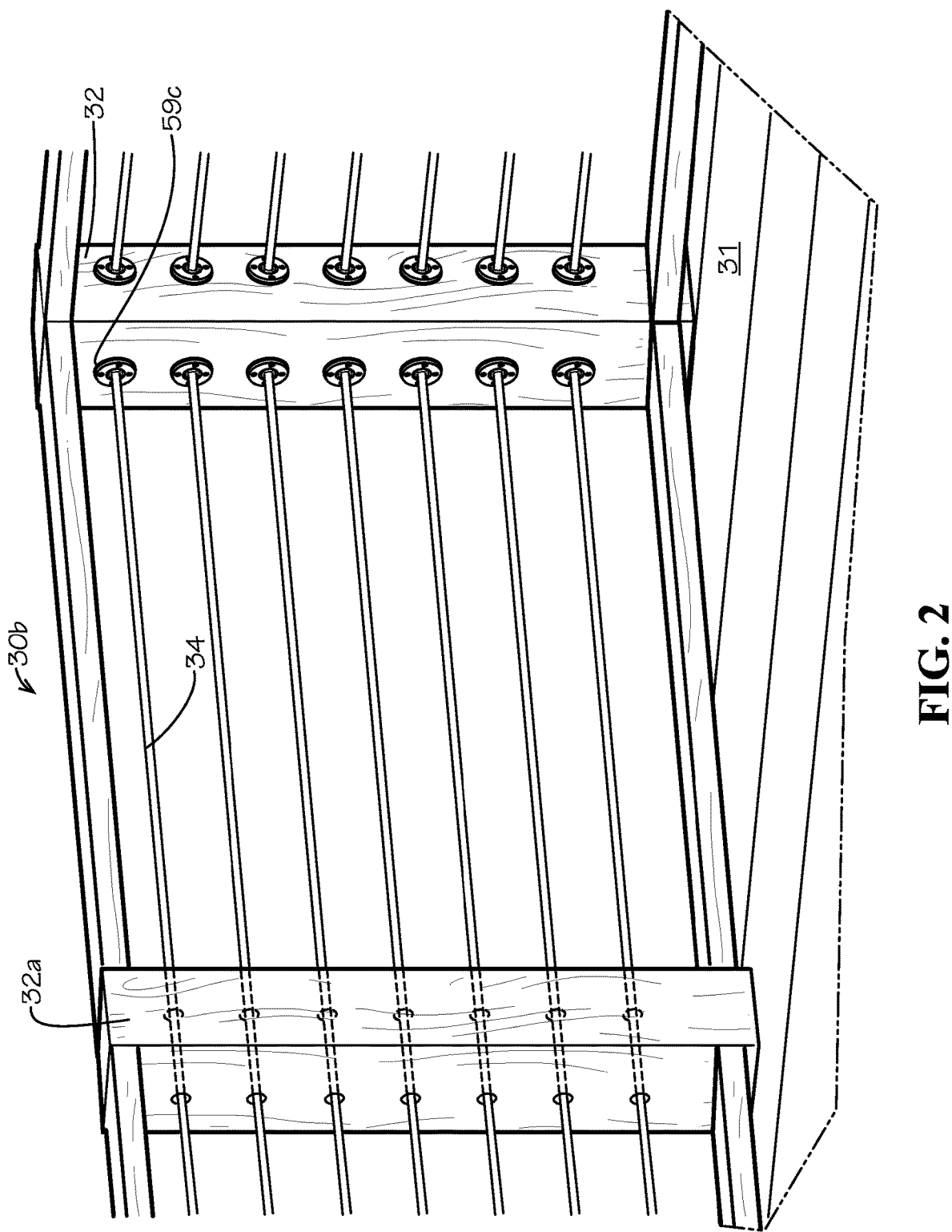
FIG. 2 is a perspective view of a cable railing system in accordance with another embodiment of the present invention that uses wood vertical support members where cables are terminated at some of the vertical support members while cables pass through other middle (non-corner) support members in an unterminated manner.

Another embodiment of a cable railing system 30b is illustrated in FIG. 2. This embodiment uses wood vertical support members 32 where the cables 34 pass through a middle (non-corner) support member 32a in an unterminated manner. The robust nature of the cable termination assemblies make this embodiment possible, even with heavy gauge cables 34 (large diameter). Tension can be exerted and maintained on the cables 34 for long distances. This saves hardware and makes installation easier.

Figure 6:
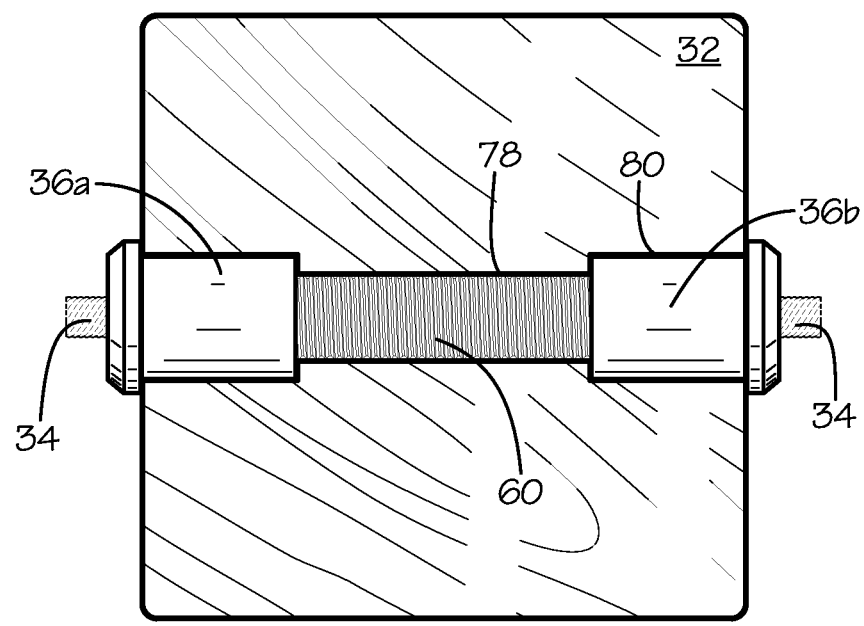
FIG. 6 a top cross-sectional view of the straight cable termination assembly of FIG. 3 while installed in a wood support member.

Referring to FIG. 3, FIG. 3 is an assembled view of a straight cable termination assembly 59a for two opposing cables 34 situated within the middle support member 32 of FIG. 1 (but shown without the wood support member 32 for clarity). As shown in FIG. 3, the cable termination assembly 59a includes a receptacle assembly 36a mounted to an elongated cylindrical, threaded, tensioning tube 60 associated with an extended receptacle assembly 36b. FIG. 6 is a top cross-sectional view of the cable termination assembly 59a of FIG. 3 while installed in a wood support member 32. The structure of the cable termination assembly 59a is very robust, enabling use of heavy cables 34, for example, those with diameters of ¼ and ⅜ inches, with middle support members 32.

FIG. 4 is an assembled view of another straight cable termination assembly 59b with a cable 34 at one end and an end cap 50a at an opposing end that can be situated in a wood support member 32. As shown in FIG. 4, the cable termination assembly 59b includes the extended receptacle assembly 36b and an end receptacle assembly 36c with end cap 50a mounted to the tensioning tube 60 of the extended receptacle assembly 36b. The end receptacle assembly 36c has a cylindrical body 44a that extends from the end cap 50a. The body 44a has in internal cylindrical threaded channel that engages and connects to the tensioning tube 60. The straight cable termination assembly 59b of FIG. 4 would look similar to FIG. 6 when installed in a wood support member 32 but would have a cable 34 extending out from only one side, not both.

Figure 5:
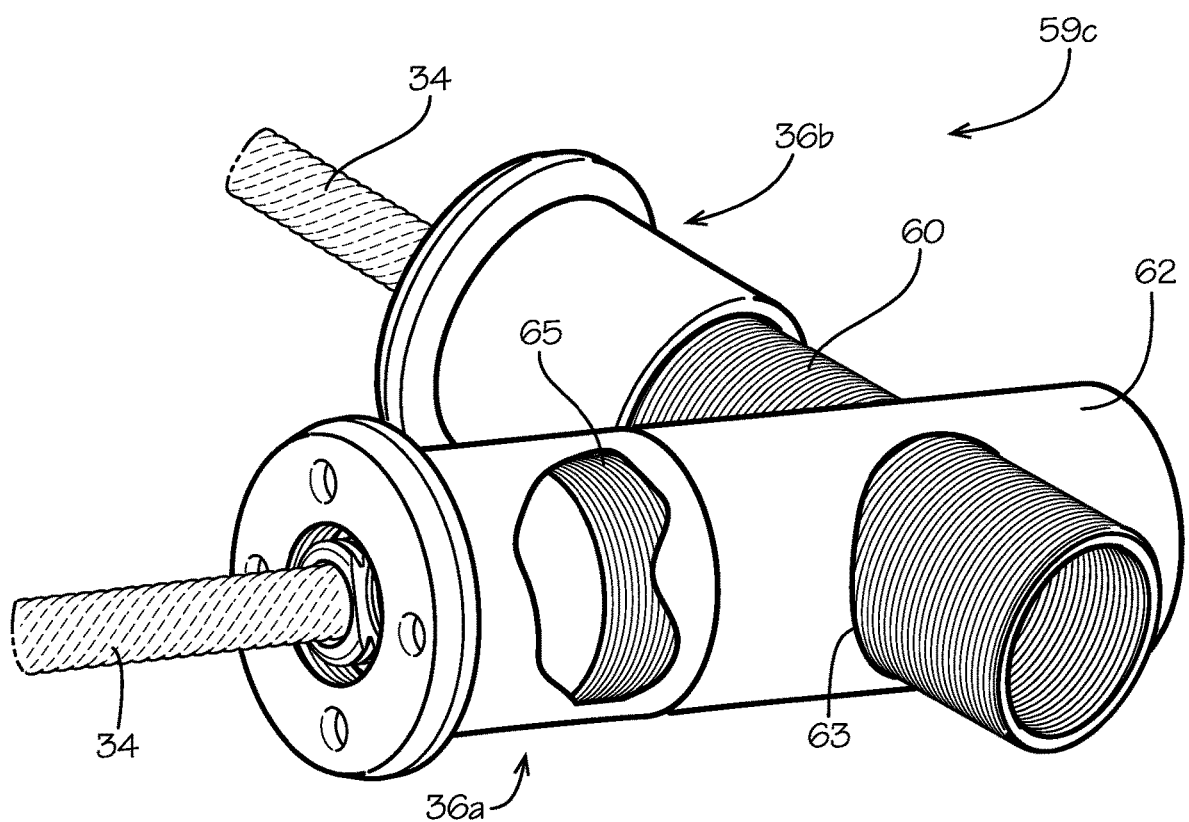
FIG. 5 is an assembled view of a corner cable termination assembly for two cables at a right angle situated within the corner support member of FIGS. 1 and 2.
Figure 7:
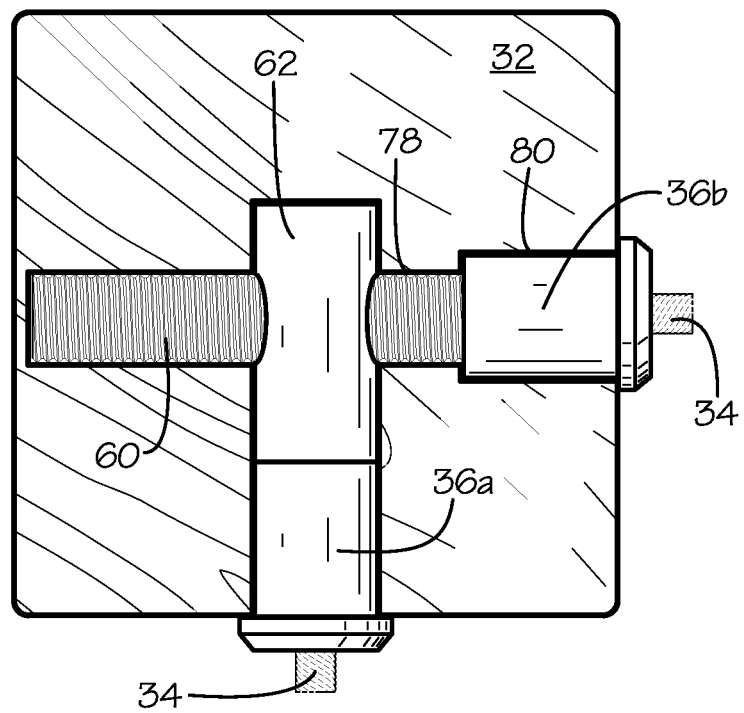
FIG. 7 is a top cross-sectional view of the corner cable termination assembly of FIG. 5 while installed in a wood support member.

With reference to FIG. 5, FIG. 5 is an assembled view of a corner cable termination assembly 59c for a corner support member 32 where two cables are generally at a right angle. As shown in FIG. 5, the cable termination assembly 59c generally includes the receptacle assembly 36a, the extended receptacle assembly 36b, and a corner adaptor tube 62. The corner adaptor tube 62 is mounted to the elongated, cylindrical, threaded, tensioning tube 60. The corner adaptor tube 62 has a cylindrical threaded aperture 63 into which the tensioning tube 60 is inserted and rotated. The corner adaptor tube 62 also includes a cylindrical threaded recessed end 65 that is inserted and rotated into the receptacle assembly 36a. The threaded tensioning tube 60 is designed to be inserted and rotated in a cylindrical threaded aperture 63 in the corner adaptor tube 62, as illustrated, so that the tensioning tube 60 and the tube 62 are substantially at a right angle. FIG. 7 is an assembled view of the corner cable termination assembly 59c situated within the corner support member of FIGS. 1 and 2. The structure of the corner cable termination assembly 59c is very robust, enabling use of heavy cables 34 with corner support members.

Figure 8:
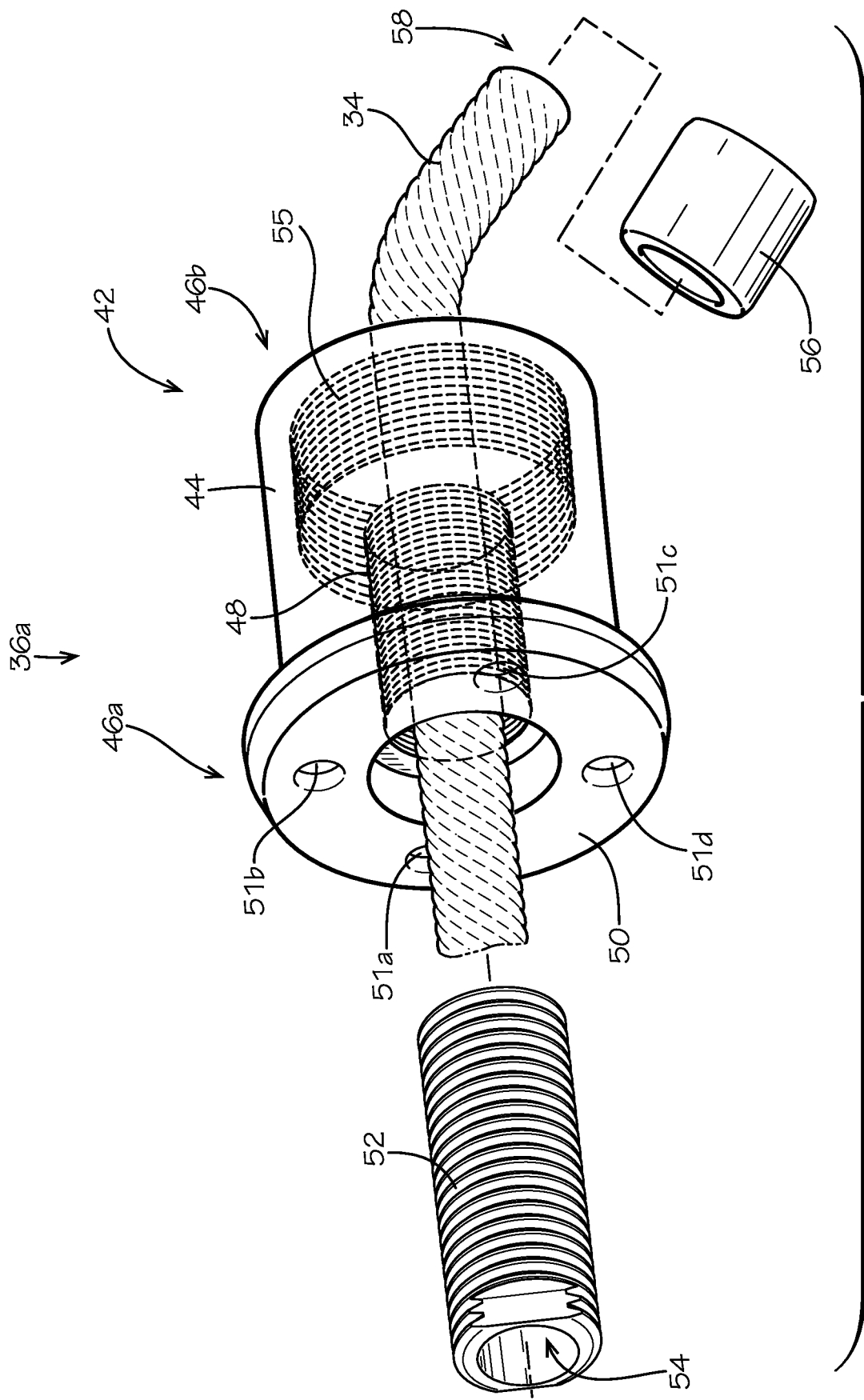
FIG. 8 is an exploded perspective view of a receptacle assembly associated with the cable termination assemblies of FIGS. 3 and 5 through 7.

FIG. 8 is an assembly view and FIG. 9 is a cross-sectional view of a receptacle assembly 36a associated with the cable termination assembly (FIGS. 3 and 5 to 7). The receptacle assembly 36a includes a receptacle 42 having an elongated cylindrical body 44 with a first end 46a and a second ends 46b. The body 44 has an elongated threaded receptacle channel 48 extending between the first and second ends 46a, 46b. The receptacle 42 has a flange 50 at the first end 46a that extends outwardly in a radial direction from the body 44. The flange 50 includes a plurality of four equally spaced circular indentations 51a, 51b, 51c, 51d at different sides of the face, which are used to rotate the receptacle 42. In a possible alternative embodiment, there are only two circular indentations, either 51a, 51c or 51b, 51d.

The receptacle assembly 36a further includes an elongated, cylindrical, threaded, tensioning insert 52 extending in the threaded receptacle channel 48 of the body 44 of the receptacle 42. The threaded tensioning insert 52 has an elongated tensioning insert channel 54 of sufficient size and shape to enable passage of the cable 34 through the tensioning insert channel 54 and to enable rotation of the insert 52 without rotation of the cable 34 that passes through it.

The receptacle assembly 36a also includes a threaded cylindrical aperture 55 that is designed to receive the tensioning tube 60 associated with an extended receptacle assembly 36b. The receptacle channel 48 of the receptacle assembly 36a is in axial alignment with internal the tensioning tube channel 61 defined by the tensioning tube 60. When the receptacle assembly 36a is engaged with the tensioning tube 60 of the extended receptacle assembly 36b, the threaded tensioning insert 52 can pass from the receptacle assembly 36a into the tensioning tube 60 in order to enable tensioning of the cable 34.

Furthermore, in the receptacle assembly 36a, a cable terminating part 56 is mounted to the cable 34 in close proximity to the cable end 58. The cable terminating part 56 is of sufficient size and shape to prevent the cable end 58 from passing through the receptacle channel 48. The cable terminating part 56 also permits free rotation of the threaded tensioning insert 52 as a respective cable 34 is tensioned without binding the respective cable 34. In the preferred embodiment, the cable terminating part 56 is a cap that has a crimping ring extending between a closed top and a bottom that receives the cable so that the cable end is enclosed within the cap. To install the cap, the cap is placed over the cable end, and the ring is squeezed with a suitable tool.

Figure 11:
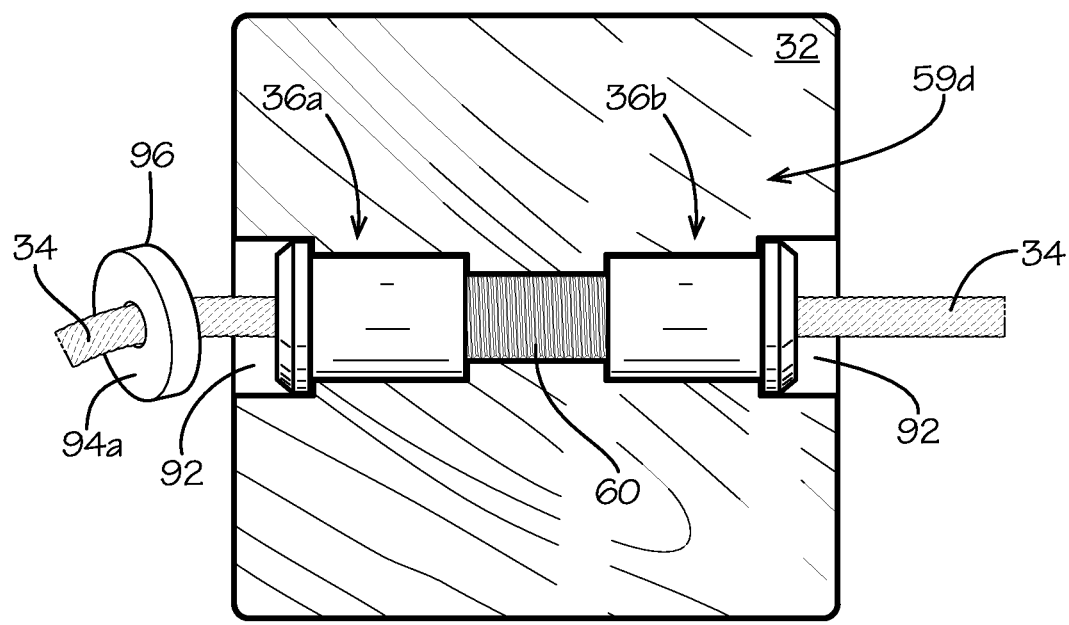
FIG. 11 is a top cross-sectional view of another embodiment of a straight cable termination assembly for a wood support member where receptacles are recessed under the external surface of the wood support member and where concealment caps can be used to fill in the recesses.

FIG. 10 is side cross-sectional view of the extended receptacle assembly 36b. The extended receptacle assembly 36b is similar in architecture to the receptacle assembly 36a. However, unlike the receptacle assembly 36a, the extended receptacle assembly 36b includes the tensioning tube 60 as an integral part, which includes outside threads for engaging a receptacle assembly 36a and inside threads for enabling the tensioning insert 52 (as well as the cable terminating part 56) to be advanced therein when tensioning the cable 34. In a possible alternative embodiment, the tensioning tube 60 may be a separate part that is threaded into a FIG. 11 is an assembled view of another straight cable termination assembly 59d with a cable 34 at one end and a cable 34 at an opposing end that can be situated in a wood support member 32. As shown in FIG. 4, the cable termination assembly 59d includes a receptacle assembly 36a mounted to the tensioning tube 60 of an extended receptacle assembly 36b. In this embodiment, the receptacle assembly 36a and the extended receptacle assembly 36b are recessed into the wood support member 32, and donut-shaped aesthetic concealment caps 94a with smooth surface peripheries 96 are inserted into respective recesses 92 so that the outer exposed faces of the concealment caps 94a are generally flush with the exterior surface of the wood support member 32. The concealment caps 94a are merely inserted into the recesses 92 and remain in mating engagement via friction. This results in an aesthetically pleasing appearance. In a possible alternative embodiment, the concealment caps 94a are not utilized.

Figure 12:
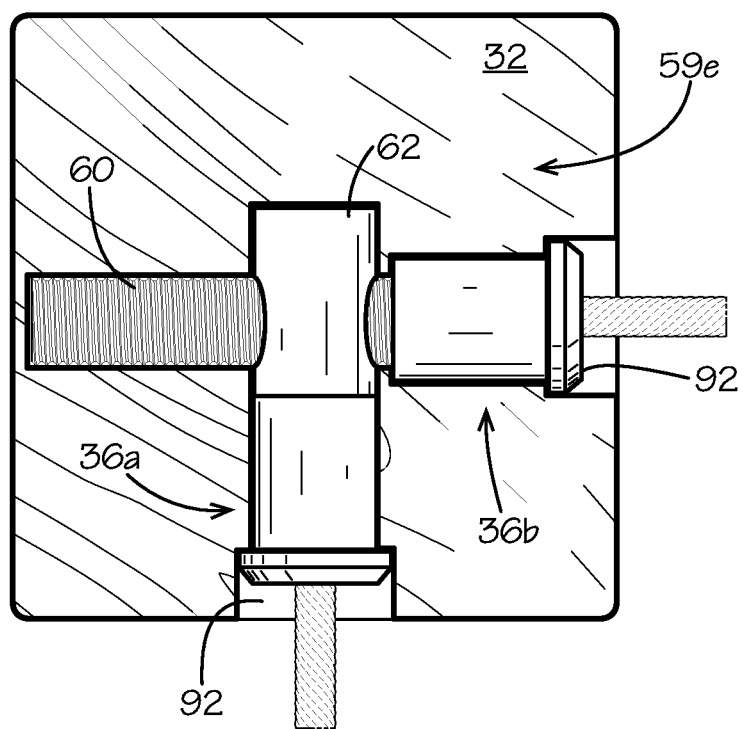
FIG. 12 is a top cross-sectional view of another embodiment of a corner cable termination assembly for a wood support member where receptacles are recessed under the external surface of the wood support member and where concealment caps with smooth surface peripheries can be used to fill in the recesses.

With reference to FIG. 12, FIG. 12 is an assembled view of another embodiment of a corner cable termination assembly 59e for a corner wood support member 32 where two cables are generally at a right angle. As shown in FIG. 12, the cable termination assembly 59d includes the recessed receptacle assemblies 36a, 36b with recesses 92. The recesses 92 can be designed to receive the donut-shaped aesthetic concealment caps 94a, depending upon the appearance that is desired.

FIG. 13 is a cross-sectional view of another embodiment of a receptacle assembly 36a associated with the cable termination assemblies 59d, 59e. Moreover, FIG. 14 is side cross-sectional view of the extended receptacle assembly 36b. The receptacle assembly 36a of FIG. 13 and the extended receptacle assembly 36b of FIG. 14 are similar in architecture as the receptacle assembly 36a of FIG. 9 and the extended receptacle assembly 36b of FIG. 10, respectively. However, the receptacle assembly 36a of FIG. 13 and the extended receptacle assembly 36b of FIG. 14 differ in that each has a threaded cylindrical aperture 102 that receives a threaded, cylindrical, concealment cap 94b, which gives an aesthetically pleasing smooth surface finish.

Figure 15:
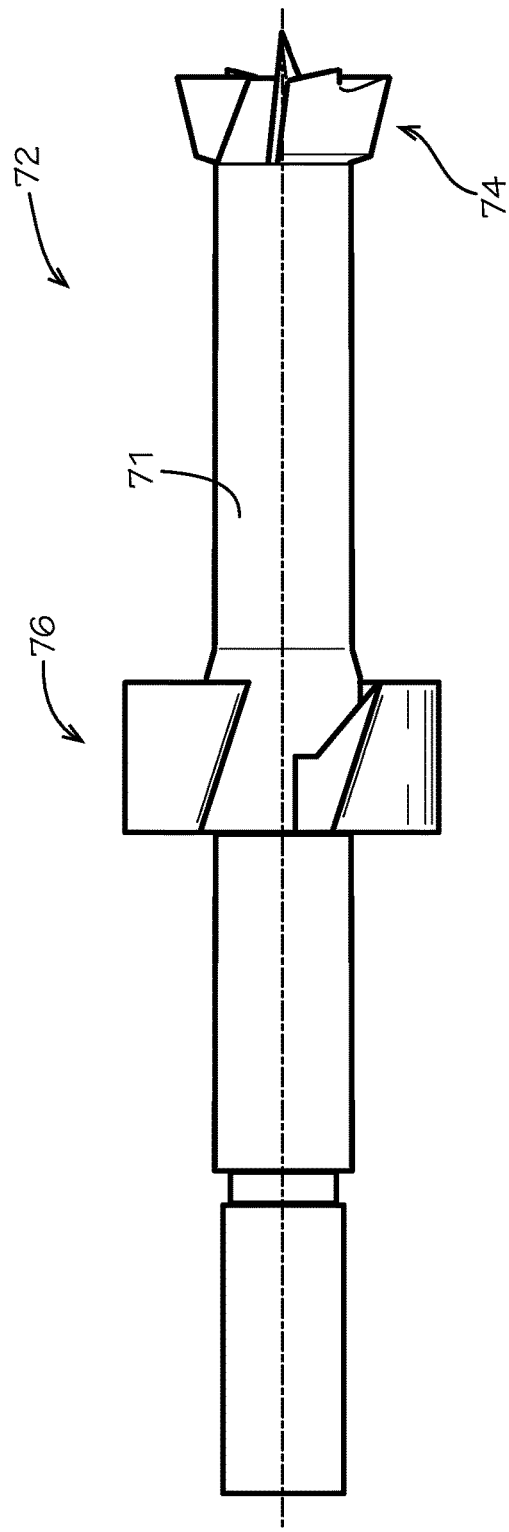
FIG. 15 is side view of a two stage forstner bit that can be utilized to create the requisite channels in a wood support member for receiving the cable termination assemblies of FIGS. 3 through 5.
Figure 16:
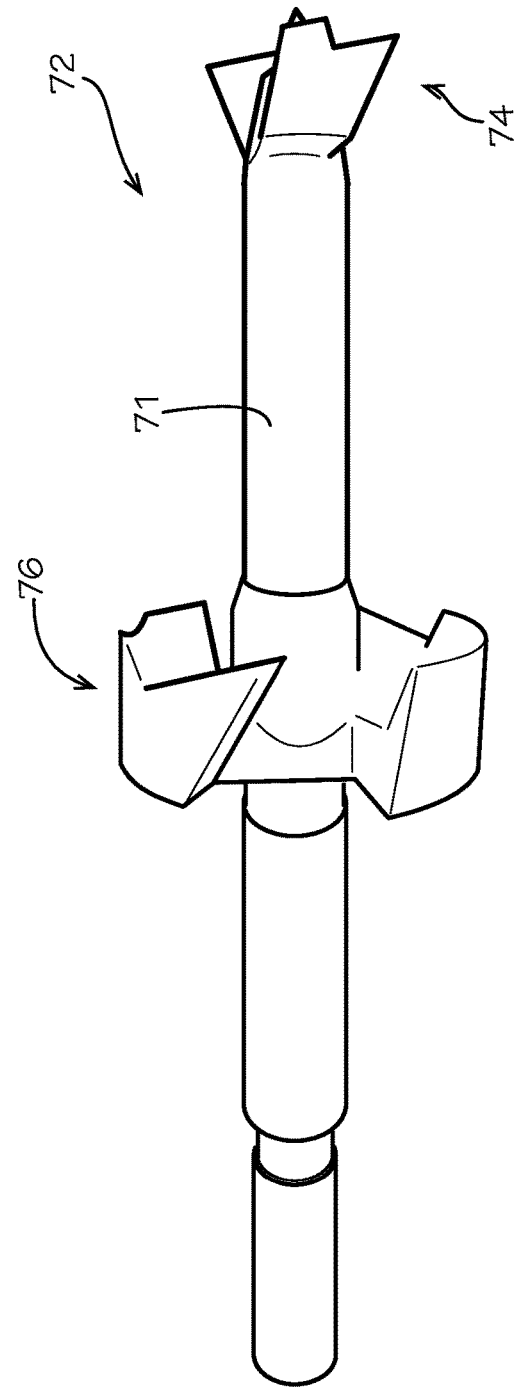
FIG. 16 is a perspective view of the forstner bit of FIG. 15.

FIG. 15 is side view of a two-stage forstner bit 72 that can be utilized to create the requisite channels in a wood support member 32 for receiving the cable termination assemblies of FIGS. 3 through 5. FIG. 16 is a perspective view of the forstner bit of FIG. 15. More specifically, the forstner bit 72 has an elongated cylindrical metal shaft 71 with a first stage 74 and a larger second stage 76. The first and second stages 74, 76 are used to bore the flat bottom holes 78, 80, respectively, in the straight cable termination assembly 59a (see FIG. 6) and the corner cable termination assembly 59c (see FIG. 7).

In yet another embodiment, a three-stage forstner bit (not illustrated) could be utilized to not only bore holes 78, 80, but also a hole for recessing flange 50 (or end cap 50a) into the wood support member 32. The third stage would be situated to the left of the second stage 76 in FIGS. 15 and 16, and would be larger in width than the first and second stages 74, 76.

Horizontal Cable Railing Systems with Metal Support Members

FIG. 17 is a perspective view of a cable railing system 80a in accordance with an embodiment of the present invention. The cable railing system 80a is shown installed on the deck 31. The cable railing system 80 uses metal vertical support members 82 where cables 34 are terminated at vertical support members 82 with cable termination assemblies (FIGS. 19 and 20) that are suited for hollow metal support members 82.

Another embodiment of a cable railing system 80b is illustrated in FIG. 18. This embodiment uses metal vertical support members 32 where the cables 34 pass through a middle (non-corner) support member 82a in an unterminated manner. The robust nature of the cable termination assemblies make this embodiment possible, even with heavy gauge cables 34 (large diameter). Tension can be exerted and maintained on the cables 34 for long distances. This saves hardware and makes installation easier.

Referring to FIG. 19, FIG. 19 is an assembled top view of a straight cable termination assembly 89a for two opposing cables 34 situated within the middle support member 82 of FIG. 17. As shown in FIG. 19, the cable termination assembly 89a includes the receptacle assembly 96a mounted to tensioning tube 104 of an extended receptacle assembly 96b. Both the receptacle assembly 96a and the extended receptacle assembly 96b are mounted to a respective elongated bar 100 that is positioned adjacent the interior surface of the metal support member 82. In the preferred embodiment, each of the bars 100 has a rectangular longitudinal body with a bottom end and a top end, and has a rectangular cross section. Each of the bars 100 has a threaded aperture 91 through which the respective receptacle assembly 96a, 96b is threaded into and mounted. The tensioning tube 104 advantageously gives space for cable tensioning and crimping. The structure of the cable termination assembly 89*a* is very robust, enabling use of heavy cables 34 with middle support members 82.

In an alternative embodiment of the straight cable termination assembly 89*a*, the extended receptacle assembly 96*b* with the tensioning tube 104 is not used, and there are two opposing receptacle assemblies 96*a* situated at opposing sides of the metal support member 82.

With reference to FIG. 20, FIG. 20 is a top assembled view of a corner cable termination assembly 89*b* for a corner support member 82 where two cables are generally at a right angle. As shown in FIG. 20, the cable termination assembly 89*b* includes the receptacle assembly 96*a* and the extended receptacle assembly 96*b*, which are mounted at right angle sides of the support member 82. In the preferred embodiment, each of the bars 100 has a rectangular longitudinal body with a bottom end and a top end, and has a rectangular cross section. Each of the bars 100 has a threaded aperture 91 through which the respective receptacle assembly 96*a*, 96*b* is threaded into and mounted thereto. The tensioning tube 104 of the extended receptacle assembly 96*b* advantageously gives space for cable tensioning and crimping. The structure of the corner cable termination assembly 89*b* is very robust, enabling use of heavy cables 34 with corner support members.

In an alternative embodiment of the corner cable termination assembly 89*b*, the extended receptacle assembly 96*b* with the tensioning tube 104 is not used, and there are two receptacle assemblies 96*a* situated at sides of the metal support member 82 that are generally at a right angle.

Note that if the walls of the support members 82 are sufficiently thick, the bars 100 may not be necessary. In these embodiments, threaded cylindrical apertures are created in the support member walls for receiving the receptacle assembly 96*a* and the extended receptacle assembly 96*b*.

FIG. 21 is a top view of an embodiment where the cable 34 passes through holes drilled in the metal support member 82. The cable 34 is not terminated in the shown support member 82, but instead in unillustrated support members 82. The robust nature of the cable termination assemblies 89*a*, 89*b* make this embodiment possible, even with a heavy gauge cable 34 (large diameter). In an alternative embodiment, flanges that look like the receptacles from an exterior standpoint can be utilized where the cables 34 enter the support members to make the pass through support members look like the others that have termination assemblies.

FIG. 22 is an assembly view and FIG. 23 is a cross-sectional view of a receptacle assembly 96*a* associated with the cable termination assembly 89*a*, 89*b* (FIGS. 19 and 20). The receptacle assembly 96*a* includes a receptacle 112 having an elongated cylindrical body 114 with a first end 116*a* and a second end 116*b*. The body 114 has an elongated threaded receptacle channel 118 extending between the first and second ends 116*a*, 116*b*. The receptacle 112 has a flange 120 at the first end 116*a* that extends outwardly in a radial direction from the body 114. The flange 120 includes circular indentations 121*a*, 121*b*, 121*c*, 121*d* at different sides of the face, which are used to rotate the receptacle 112. In an alternative embodiment, there are two circular indentations 121*a*, 121*c* or 121*b*, 121*d*.

The receptacle assembly 96 further includes an elongated, cylindrical, threaded, tensioning insert 122 extending in the threaded receptacle channel 118 of the body 114 of the receptacle 112. The threaded tensioning insert 122 has opposing parallel planar grip surfaces 123*a*, 123*b* at one end.

The threaded tensioning insert 122 has an elongated tensioning insert channel 124 of sufficient size and shape to enable passage of the cable 34 through the tensioning insert channel 124.

The receptacle assembly 96*a* also includes a threaded cylindrical aperture 90 that is designed to receive the tensioning tube 104 associated with an extended receptacle assembly 36*b*. When the receptacle assembly 96*a* is engaged with the tensioning tube 104 of the extended receptacle assembly 36*b*, the threaded tensioning insert 122 can pass from the receptacle assembly 96*a* into the tensioning tube channel 105 defined by the tensioning tube 104 in order to enable tensioning of the cable 34.

Furthermore, in the receptacle assembly 96*a*, a cable terminating part 126 is mounted to the cable 34 in close proximity to the cable end 128. The cable terminating part 126 is of sufficient size and shape to prevent the cable end 128 from passing through the receptacle channel 124. The cable terminating part 126 also permits free rotation of the threaded tensioning insert 122 as the respective cable 34 is tensioned without binding the respective cable 34. In the preferred embodiment, the cable terminating part 126 is a cap that has a crimping ring extending between a closed top and a bottom that receives the cable so that the cable end is enclosed within the cap. To install the cap, the cap is placed over the cable end, and the ring is squeezed with a suitable tool.

FIG. 24 is side cross-sectional view of the extended receptacle assembly 96*b*. The extended receptacle assembly 96*b* is similar in architecture to the receptacle assembly 96*a* of FIG. 23. However, unlike the receptacle assembly 96*a* of FIG. 23, the extended receptacle assembly 96*b* includes the tensioning tube 104 as an integral part, which includes outside threads for engaging a receptacle assembly 96*a* of FIG. 23 and inside threads for enabling the tensioning insert 122 (as well as the cable terminating part 126) to be advanced therein when tensioning the cable 34. In a possible alternative embodiment, the tensioning tube 104 may be a separate part that is threaded into a threaded aperture associated with the extended receptacle assembly 96*b*.

Referring to FIG. 25, FIG. 25 shows an assembled top view of another embodiment of a straight cable termination assembly 89*c* for two opposing cables 34 situated within the middle support member 82 of FIG. 17. As shown in FIG. 25, the cable termination assembly 89*c* includes the receptacle assemblies 96 mounted to respective elongated bars 100 that are positioned adjacent the interior surface of the metal support member 82. In the preferred embodiment, each of the bars 100 has a rectangular longitudinal body with a bottom end and a top end, and has a rectangular cross section. Each of the bars 100 has a threaded aperture 91 through which the respective receptacle assembly 96*a*, 96*b* is threaded and mounted. Moreover, the receptacle assembly 96*a* is mounted to the elongated, cylindrical, tensioning tube 104 of the extended receptacle assembly 96*b*. The tensioning tube 104 advantageously gives space for cable tensioning and crimping. A cross-sectional view of the receptacle assembly 96*a* and the extended receptacle assembly 96*b* is shown in FIGS. 27 and 28, respectively. Concealment caps 134 having a threaded outside periphery are threaded into the threaded apertures 91, as shown. The structure of the cable termination assembly 89*c* is very robust, enabling use of heavy cables 34 with middle support members 82. Also, the concealment caps 134 give an aesthetically pleasing smooth finish.

In an alternative embodiment of the straight cable termination assembly 89*c*, the extended receptacle assembly 96*b* with the tensioning tube 104 is not used, and there are two opposing receptacle assembly 96a situated at opposing sides of the metal support member 82.

With reference to FIG. 26, FIG. 26 is a top assembled view of a corner cable termination assembly 89d for a corner support member 82 where two cables 34 are generally at a right angle. As shown in FIG. 26, the cable termination assembly 89d includes the receptacle assembly 96a and the extended receptacle assembly 96b, which are mounted on opposing sides of the support member 82. In the preferred embodiment, each of the bars 100 has a rectangular longitudinal body with a bottom end and a top end, and has a rectangular cross section. Each of the bars 100 has a threaded aperture 132 through which the respective receptacle assembly 96a, 96b is threaded and mounted. Concealment caps 134 are threaded into the threaded apertures 91, as shown. A cross-sectional view of the receptacle assembly 96a and the extended receptacle assembly 96b are shown in FIGS. 27 and 28, respectively. The structure of the corner cable termination assembly 89d is very robust, enabling use of heavy cables 34 with corner support members.

In an alternative embodiment of the corner cable termination assembly 89c, the extended receptacle assembly 96b with the tensioning tube 104 is not used, and there are two receptacle assemblies 96a situated at sides of the metal support member 82 that are generally at a right angle.

Horizontal Cable Railing Systems with Concrete Support Members

The present disclosure provides embodiments of cable termination assemblies that can be used in connection with concrete support members, which could be walls.

In the case of a concrete support member having a completely concrete cross section without weld plates, the cable termination assemblies 59a to 59c (FIGS. 3 to 5) can be utilized. In some of these embodiments, in connection with the corner cable termination assembly 59c (FIG. 5), it is advisable to additionally include an end receptacle assembly 36c (FIG. 4) attached to the extended receptacle assembly 36b (FIG. 5) for further support.

In the case of a concrete support member having one or more weld plates along or within the concrete support member, the cable termination assemblies 89a, 89b (FIGS. 19 and 20) can be utilized. In these embodiments, the weld plates associated with the concrete support members are used as a substitute for the bars 100.

Receptacle Installation Tool

FIGS. 29 through 33 illustrate a receptacle installation tool 140 for installing the receptacles 42, 112 associated with the cable termination assemblies in wood or metal support members 32, 82 or concrete support members. For simplicity, the illustrations show use of the tool 140 in connection with a metal support member 82, but the process is equally applicable to a wood support member 32 or concrete support member.

To assemble the installation tool 140, as shown in FIG. 29, a receptacle driver 142 is inserted into a gripping sleeve 144. The receptacle driver 142 has a stud driver 153 that is attached to and extends from an extension 152, which is attached to and extends from a hexagonal disk 150. The extension has a hexagonal part 155 and a cylindrical part 157. Cylindrical nubs 156a, 156b and a threaded stud 158 are attached to and extend from the hexagonal disk 150. The receptacle driver 142 and gripping sleeve 144 are coupled together. A set screw 146 is threaded into an aperture 148 in the sleeve 144 and exerts force against a side of the extension 152 of the receptacle driver 142. In the assembled condition, the hexagonal disk 150 rests in a corresponding hexagonal cavity 179 within the gripping sleeve 144.

Once the tool 140 is assembled, as shown in FIG. 30, the extension 152 as well as the stud driver 153 of the receptacle driver 142 extends from a first end 154a of the sleeve 144. Also, outwardly extending smooth cylindrical nubs 156a, 156b as well as the threaded stud 158 extend from a second end 154b of the sleeve 144. The stud driver 153 is attached to and can be used to rotate the threaded stud 158.

FIG. 31 shows how the receptacle installation tool 140 is attached to a receptacle 112. Essentially, the outwardly extending nubs 156a, 156b of the tool 140 extend into respective indentations 121a, 121c or 121b, 121d (or the indentations 51a, 51c or 51b, 51d in the case of wood) of the receptacle 112. Because of the spacing of the indentations, the nubs 156a, 156b of the tool 140 can be aligned and engaged with the indentations by a quarter turn of the tool 140. The gripping sleeve 144 can be hand turned in order to rotate the receptacle 112 and drive the receptacle 112 in and out of the support member 82.

During installation of a receptacle 112, the tool 140 is used to rotate the receptacle 112 into the support member 82 so that the exterior flange of the receptacle 112 is flush or recessed, depending upon the desired embodiment. As shown in FIGS. 31 and 32, a conventional wrench 162, for example but not limited to, an Allen wrench, is inserted into a hexagonal aperture 164 associated with the stud driver 142 in order to assist with attaching the tool 140 to the receptacle 112. The wrench 162, which controls rotation of the stud 158 into the threaded channel of the receptacle, can be turned until the tool 140 is snugly attached to the receptacle 112. Then, as shown in FIG. 33, a conventional hexagonal wrench 166 can be used to rotate the hexagonal extension 152 in order to rotate the receptacle 112 inwardly to a suitable depth in or within the support member 82.

Cable Tensioning Tool

FIGS. 34 and 35 illustrate a cable tensioning tool 172 for putting tension on a cable 34 after a receptacle has been installed in a wood or metal support member 32, 82 or concrete support member. For simplicity, this description is directed to use of the tool 140 in connection with a metal support member 82, but the process is equally applicable to a wood support member 32 and a concrete support member.

The tensioning tool 172 includes the gripping sleeve 144 and a tension exertion apparatus 174. The tension exertion apparatus 174 is inserted into the sleeve 144. The tension exertion apparatus 174 includes a centrally located hexagonal part 175 that rests in the hexagonal cavity 179 associated with the gripping sleeve 144. A set screw 146 is threaded into sleeve aperture 148 and impinges upon a side of the hexagonal in order to hold them together. During assembly, as is shown in FIG. 34, a longitudinal slot 176 in sleeve 144 is longitudinally aligned with a longitudinal slot 178 of the tension exertion apparatus 174 so that the tool 172 can be placed around the cable 34 and inserted into the receptacle 112.

The tension exertion apparatus 174 further includes a hexagonal region as shown in FIGS. 34 and 35 near the hexagonal part 175 and smaller than same to receive a wrench (not shown) for rotating the tensioning tool 172.

The tension exertion apparatus 174 includes a spring-loaded movable end 182a and a fixed end 182b that is fixed with respect to the sleeve 144. The movable end 182a has open opposing channels 184a, 184b, for engaging opposing grip surfaces 123a, 123b at the end of the threaded channel tensioning insert 122 of the receptacle assembly 96 (see FIGS. 20 and 21). Furthermore, spring 186 of the tension exertion apparatus 174 is designed to exert inward force against the movable end 182a as well as the channel tensioning insert 122 of the receptacle assembly 96 when the tool 174 is in use. As the gripping sleeve 144 is turned to move the receptacle assembly 96 into the metal support member 82, the movable end 182a rotates the tensioning insert 122 while also exerting inward force against the threaded tensioning insert 122 as well as the crimped end cap 126 and cable 34.

Vertical Cable Railing Systems

FIG. 36 is a perspective view of a cable railing system 190 in accordance with another embodiment of the present invention. In this embodiment, cables 34 are mounted in a vertical configuration to horizontal support members 192, one situated at the top and another situated at the bottom. The horizontal support members 192 can be wood, metal (e.g., aluminum, steel, etc.), concrete, or a combination thereof, and can use the cable termination assemblies described above. Heavy, large diameter cables 34 can be used because of the ability to robustly mount the receptacles with the receptacle installation tool 140 and sufficiently tension the cables 34 with the tensioning tool 172. A significant advantage of this vertical configuration, among others, is that it eliminates the ladder effect, thus making it more difficult for a person to climb up and over the cable railing system 190.

For embodiments where the horizontal support members 192 are metal of adequate thickness, the receptacle assembly 96a and the extended receptacle assembly 96b (FIG. 19) can be used to terminate and secure the vertical cables 34. The receptacle assemblies 96a, 96b are threaded into threaded apertures within the horizontal support members 192. One of the receptacle assemblies 96a, 96b is situated at each end of each of the cables 34, as needed. In some embodiments, particularly if the length of the cable 34 is long, an extended receptacle assembly 96b is used to secure at least one and perhaps both ends of each cable 34 in order to allow sufficient cable tensioning.

For embodiments where the metal support members 192 are not of sufficient thickness or where the support members 192 are wood, then bars 100 (FIG. 19) can be employed, and the assemblies 96a, 96b are secured in threaded apertures in the bars 100, as needed. One of the receptacle assemblies 96a, 96b is situated at each end of each of the cables 34, as needed. In some embodiments, particularly if the length of the cable 34 is long, an extended receptacle assembly 96b is used to secure at least one and perhaps both ends of each cable 34 in order to allow sufficient cable tensioning.

In further embodiments where vertical cables 34 are stacked vertically with horizontal support members 192 of wood or metal situated therebetween, the applicable straight termination assemblies described previously can be used.

In further embodiments where vertical and horizontal cables 34 are utilized with support members of wood and/or metal, the applicable corner termination assemblies described previously can be used.

Additional Embodiments, Variations, and Modifications

While in the foregoing specification this invention has been described in relation to certain embodiments thereof, and many details have been put forth for the purpose of illustration, it will be apparent to those skilled in the art that the invention can present additional embodiments and that certain of the details described herein can be varied considerably without departing from the basic principles of the invention.

As an example of an additional embodiment, the cable termination assemblies of the present disclosure that are designed for use in connection with solid support members can be made of materials other than wood and concrete.

As another example of an additional embodiment, the cable termination assemblies of the present disclosure that are designed for use in connection with the hollow support members can be made of a material other than metal.

As yet another example of an alternative embodiment, the support members that support the cables may have a generally circular cross section along their lengths, i.e., be designed in a cylindrical manner, as opposed to square or rectangular.

As still another example of an alternative embodiment, one or more of the support members may be a flat metal plate that receives receptacle assemblies as described herein for terminating cables.

The invention claimed is:

1. A straight cable termination assembly for a railing system having support members that support a metal cable railing, comprising:
    a support member having sides extending from a first end to a second end, the sides defining an interior region of a solid material, comprising:
    a tensioning tube having an elongated cylindrical body extending from a first end to a second end, the tube situated within a hole through the solid support member, the body defining an elongated cylindrical tensioning tube channel extending from the first end to the second end; and
    first and second receptacle assemblies mounted respectively at first and second ends of the tube, the first receptacle assembly situated at a first side of the support member and the second receptacle assembly situated at a second side of the support member, the second side opposing the first side, each receptacle assembly comprising:
        a cable end associated with a cable;
        a receptacle having an elongated cylindrical body with first and second ends, the body having an elongated threaded receptacle channel extending between the first and second ends, the receptacle having a flange at the first end that extends outwardly in a radial direction from the body, the receptacle channel situated in axial alignment with the tensioning tube channel;
        an elongated cylindrical threaded tensioning insert extending in the threaded channel of the body of the receptacle, the threaded tensioning insert having an elongated tensioning insert channel of sufficient size and shape to enable passage of the cable through the channel;
        a cable terminating part that is mounted to the cable in close proximity to the cable end, the cable terminating part of sufficient size and shape to prevent the cable end from passing through the receptacle channel at the second end of the receptacle body;
    wherein the tensioning insert of is capable of extending at least in part into the tensioning tube channel due to the axial alignment of the receptacle channel and the tensioning tube channel; and
    wherein the tensioning insert is capable of rotation in either direction without rotating the cable and the cable terminating part.

2. The assembly of claim 1, wherein the cable terminating part is a crimping ring that is crimped to the cable in close proximity to the cable end.

3. The assembly of claim 2, wherein the crimping ring is a cap having the ring extending between a closed top and a bottom that receives the cable so that the cable end is enclosed within the cap.

4. The assembly of claim 1, wherein the elongated support member has a body that extends and is oriented horizontally and the cables extend and are oriented vertically.

5. The assembly of claim 1, wherein the elongated support member has a body that extends and is oriented vertically and the cables extend and are oriented horizontally.

6. The assembly of claim 1, further comprising a cylindrical concealment cap contiguous with the first end of the receptacle, the concealment cap having a hole through which the cable passes, the concealment cap having a flat exterior surface that is substantially level with a surrounding surface.

7. The assembly of claim 6, wherein the concealment cap has a smooth surface around its periphery.

8. The assembly of claim 6, wherein the concealment cap has a threaded periphery.

9. The assembly of claim 1, wherein in connection with the first receptacle assembly, the second receptacle assembly, or both, the tensioning insert extends at least in part into the tensioning tube channel due to the axial alignment of the receptacle channel and the tensioning tube channel.

10. The assembly of claim 1, wherein the tensioning tube is an integral part of the first receptacle assembly.

11. The assembly of claim 1, wherein the solid material associated with the interior region of the support member is wood.

12. The assembly of claim 1, wherein the solid material associated with the interior region of the support member is concrete.

13. A corner cable termination assembly for a railing system, comprising:
a support member at a corner of the railing system that supports a metal cable railing, the support member having sides extending from a first end to a second end, the sides defining an interior region of a solid material;
a tensioning tube having an elongated cylindrical body extending from a first end to a second end, the tube situated within a hole through the solid support member, the body defining an elongated cylindrical tensioning tube channel extending from the first end to the second end;
a corner adaptor tube having an elongated cylindrical body extending from a first end to a second end, the first end having a cylindrical threaded recessed part, the corner adaptor tube having a cylindrical threaded aperture that receives the tensioning tube therethrough so that the bodies of the tensioning tube and the corner adaptor tube are at substantially a right angle; and
first and second receptacle assemblies, the first receptacle assembly mounted at the first end of the tensioning tube, the second receptacle assembly mounted to the recessed part of the corner adaptor tube, each of the first and second receptacle assemblies comprising:
a cable end associated with a cable;
a receptacle having an elongated cylindrical body with first and second ends, the body having an elongated threaded receptacle channel extending between the first and second ends, the receptacle having a flange at the first end that extends outwardly in a radial direction from the body;
an elongated cylindrical threaded tensioning insert extending in the threaded channel of the body of the receptacle, the threaded tensioning insert having an elongated tensioning insert channel of sufficient size and shape to enable passage of the cable through the channel; and
a cable terminating part that is mounted to the cable in close proximity to the cable end, the cable terminating part of sufficient size and shape to prevent the cable end from passing through the receptacle channel at the second end of the receptacle body;
wherein in connection with the first receptacle assembly, the receptacle channel is in axial alignment with the tensioning tube channel so that the tensioning insert is capable of extending at least in part into the tensioning tube channel; and
wherein the tensioning insert is capable of rotation in either a clockwise or counterclockwise direction without rotating the cable and the cable terminating part.

14. The assembly of claim 13, wherein the cable terminating part is a crimping ring that is crimped to the cable in close proximity to the cable end.

15. The assembly of claim 14, wherein the crimping ring is a cap having the ring extending between a closed top and a bottom that receives the cable so that the cable end is enclosed within the cap.

16. The assembly of claim 13, wherein the elongated support member has a body that extends and is oriented horizontally.

17. The assembly of claim 13, wherein the elongated support member has a body that extends and is oriented vertically.

18. The assembly of claim 13, further comprising a cylindrical concealment cap contiguous with the first end of the receptacle, the concealment cap having a hole through which the cable passes, the concealment cap having a flat exterior surface that is substantially level with a surrounding surface associated with the support member or the flange.

19. The assembly of claim 18, wherein the concealment cap has a smooth surface around its periphery.

20. The assembly of claim 18, wherein the concealment cap has a threaded periphery.

21. The assembly of claim 13, wherein in connection with the first receptacle assembly, the second receptacle assembly, or both, the tensioning insert extends at least in part into the tensioning tube channel due to the axial alignment of the receptacle channel and the tensioning tube channel.

22. The assembly of claim 13, wherein the tensioning tube is an integral part of the first receptacle assembly so that the receptacle assembly and the tensioning tube are a unitary part.

23. The assembly of claim 13, wherein the solid material associated with the interior region of the support member is wood.

24. The assembly of claim 13, wherein the solid material associated with the interior region of the support member is concrete.

25. A cable railing system for support members that support a metal cable railing, comprising:
(a) elongated first and second support members, each of the support members having sides extending from a first end to a second end, the sides defining an interior region of a solid material;
(b) a cable extending between the first and second support members;

(c) a cable termination assembly in each of the first and second support members, each cable termination assembly comprising:
  (1) a straight tensioning tube having an elongated cylindrical body extending from a first end to a second end, the body defining an elongated cylindrical tensioning tube channel extending from the first end to the second end;
  (2) a first receptacle assembly secured at the first end of the tensioning tube, the first receptacle assembly comprising:
    a. a cable end;
    b. a receptacle having an elongated cylindrical body with first and second ends, the body having an elongated threaded receptacle channel extending between the first and second ends, the receptacle having a flange at the first end that extends outwardly in a radial direction from the body, the receptacle channel situated in axial alignment with the tensioning tube channel;
    c. an elongated cylindrical threaded tensioning insert extending in the threaded channel of the body of the receptacle, the threaded tensioning insert having an elongated tensioning insert channel of sufficient size and shape to enable passage of the cable through the channel; and
    d. a cable terminating part that is mounted to the cable in close proximity to the cable end, the cable terminating part of sufficient size and shape to prevent the cable end from passing through the receptacle channel at the second end of the receptacle body; and
  (3) a second receptacle assembly mounted to the second end of the tube, the second receptacle assembly comprising:
    a. a receptacle having an elongated cylindrical body with first and second ends, the body having an elongated threaded receptacle channel extending between the first and second ends, the receptacle having an end cap at the first end that extends outwardly in a radial direction from the body, the end cap enclosing the first end of the receptacle.

26. The cable railing system of claim 25, wherein the cable terminating part is a crimping ring that is crimped to the cable in close proximity to the cable end.

27. The cable railing system of claim 26, wherein the crimping ring is a cap having the ring extending between a closed top and a bottom that receives the cable so that the cable end is enclosed within the cap.

28. The cable railing system of claim 25, wherein first and second elongated support members each have bodies that extend and are oriented horizontally and the cable extends and is oriented vertically.

29. The cable railing system of claim 25, wherein first and second elongated support members each have bodies that extend and are oriented vertically and the cable extends and is oriented horizontally.

30. The cable railing system of claim 25, further comprising an elongated third support member situated between the first and second support members, the third support member having an internal channel through which the cable passes without termination.

31. The cable railing system of claim 25, further comprising an elongated third support member situated between the first and second support members, the third support member having a third cable termination assembly, the third cable termination assembly comprising:
  a third straight tensioning tube having an elongated cylindrical body extending from a first end to a second end; and
  a pair of the first receptacle assemblies, one mounted at the first end of the third straight tensioning tube and the other mounted at the second end of the third straight tensioning tube.

32. The cable railing system of claim 25, further comprising an elongated third support member situated at a corner between the first and second support members, the third support member having a third cable termination assembly, the third cable termination assembly comprising:
  a third straight tensioning tube having an elongated cylindrical body extending from a first end to a second end;
  a corner adaptor tube having an elongated cylindrical body extending from a first end to a second end, the first end having a cylindrical threaded recessed part, the corner adaptor tube having a cylindrical threaded aperture that receives the third straight tensioning tube therethrough;
  one of the first receptacle assembly mounted at the first end of the tube;
  another of the first receptacle assembly mounted to the recessed part of the corner adaptor tube; and
  wherein the bodies of the one first receptacle and the another first receptacle are at substantially a right angle relative to each other.

* * * * *